(12) United States Patent
Min et al.

(10) Patent No.: US 9,052,498 B2
(45) Date of Patent: Jun. 9, 2015

(54) MULTILAYER OPTICAL SHEET MODULE

(71) Applicants: Jee Hong Min, Seongnam (KR); Young Il Kim, Yongin (KR); Sung Sik Cho, Suwon (KR); Woo Jong Lee, Osan (KR); Tae Jun Lee, Osan (KR); Hee Jeong Kim, Osan (KR); Joon Hwan Hwang, Seoul (KR); Sung Min Cho, Seongnam (KR); Oh Hyun Kwon, Osan (KR); Jin Gil Jeong, Anyang (KR)

(72) Inventors: Jee Hong Min, Seongnam (KR); Young Il Kim, Yongin (KR); Sung Sik Cho, Suwon (KR); Woo Jong Lee, Osan (KR); Tae Jun Lee, Osan (KR); Hee Jeong Kim, Osan (KR); Joon Hwan Hwang, Seoul (KR); Sung Min Cho, Seongnam (KR); Oh Hyun Kwon, Osan (KR); Jin Gil Jeong, Anyang (KR)

(73) Assignee: LMS CO., LTD., Pyeongtaek (KR)

( * ) Notice: Subject to any disclaimer, the term of this patent is extended or adjusted under 35 U.S.C. 154(b) by 237 days.

(21) Appl. No.: 13/708,930

(22) Filed: Dec. 8, 2012

(65) Prior Publication Data

US 2013/0148198 A1 Jun. 13, 2013

(30) Foreign Application Priority Data

Dec. 8, 2011 (KR) .................. 10-2011-0130995
Jun. 25, 2012 (KR) .................. 10-2012-0068049

(51) Int. Cl.
| | |
|---|---|
| *G02B 27/28* | (2006.01) |
| *G02B 27/00* | (2006.01) |
| *B32B 3/30* | (2006.01) |
| *G02B 5/02* | (2006.01) |
| *G02B 5/04* | (2006.01) |
| *F21V 8/00* | (2006.01) |

(52) U.S. Cl.
CPC .............. *G02B 27/00* (2013.01); *G02B 27/28* (2013.01); *B32B 3/30* (2013.01); *Y10T 428/24562* (2013.01); *G02B 5/0231* (2013.01); *G02B 5/0278* (2013.01); *G02B 5/045* (2013.01); *G02B 6/0053* (2013.01)

(58) Field of Classification Search
CPC ...... G02B 27/00; G02B 27/28; G02B 5/0231; G02B 5/0278; G02B 5/045; G02B 6/0053; B32B 3/30; Y10T 428/24562
USPC .................................. 359/485.03; 349/62, 64
See application file for complete search history.

(56) References Cited

U.S. PATENT DOCUMENTS

| | | | | |
|---|---|---|---|---|
| 5,124,841 | A * | 6/1992 | Oishi ...................... | 359/485.02 |
| 5,422,756 | A * | 6/1995 | Weber ...................... | 359/485.03 |
| 5,587,816 | A * | 12/1996 | Gunjima et al. ............... | 349/62 |
| 6,239,851 | B1 * | 5/2001 | Hatazawa et al. .............. | 349/62 |
| RE37,377 | E * | 9/2001 | Gunjima et al. .................. | 349/9 |
| 6,975,455 | B1 * | 12/2005 | Kotchick et al. ......... | 359/485.03 |
| 7,139,125 | B1 * | 11/2006 | Mi ........................... | 359/485.02 |
| 7,666,492 | B2 * | 2/2010 | Shimmo et al. ............... | 428/161 |
| 2003/0075264 | A1 * | 4/2003 | Terakado et al. ......... | 156/244.24 |
| 2012/0307180 | A1 * | 12/2012 | Wang et al. ..................... | 349/64 |

* cited by examiner

*Primary Examiner* — Frank Font

(74) *Attorney, Agent, or Firm* — Patent Office of Dr. Chung Park

(57) ABSTRACT

There is disclosed a multilayer optical sheet module including an upper optical sheet comprising a first structural pattern projected upward; a lower optical sheet disposed under the upper optical sheet, the lower optical sheet comprising a second structural pattern projected toward the upper optical sheet; and an adhesion layer provided between the upper optical sheet and the lower optical sheet, wherein the second structural pattern includes a light transmitting part having a traverse cross section getting smaller along an upward direction; and an embedded part continuously connected to an upper portion of the light transmitting part, with a predetermined portion embedded in the adhesion layer, and a circumference of a cross section possessed by the embedded part, contacting with the adhesion layer, is larger than a circumference of a virtual cross section locus formed by extending the light transmitting part upward, with a continuous slope.

35 Claims, 24 Drawing Sheets

FIG. 12A
FIG. 12B
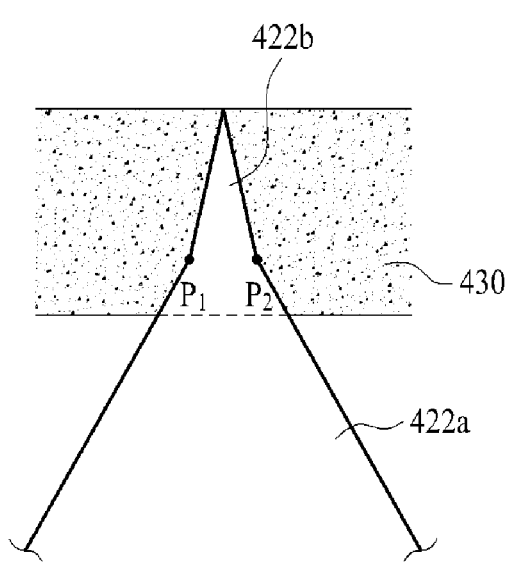
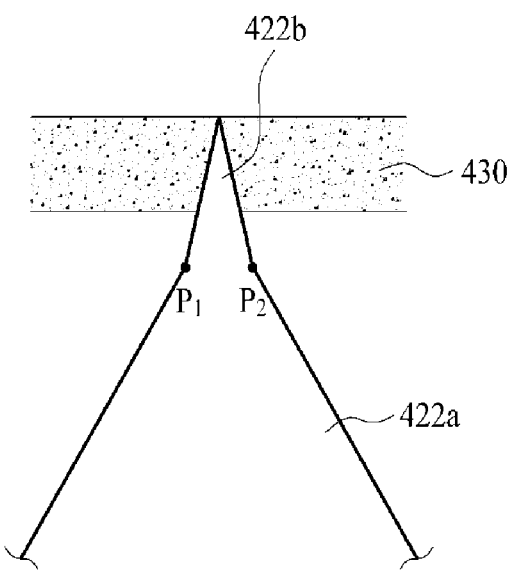

FIG. 13A
FIG. 13B
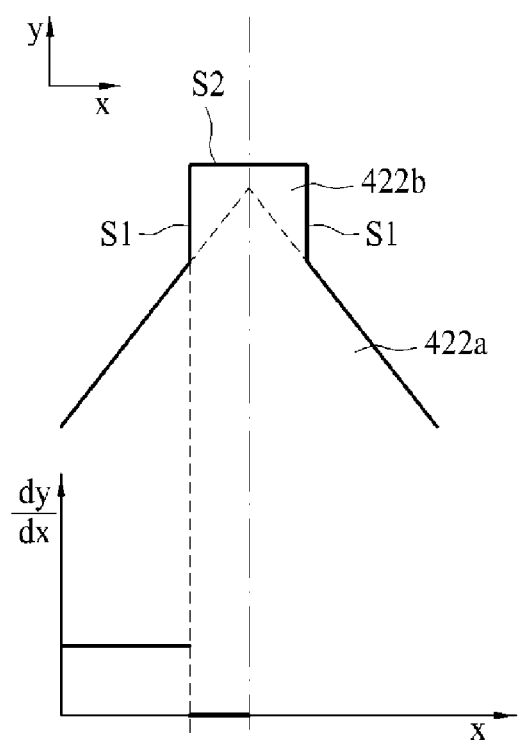
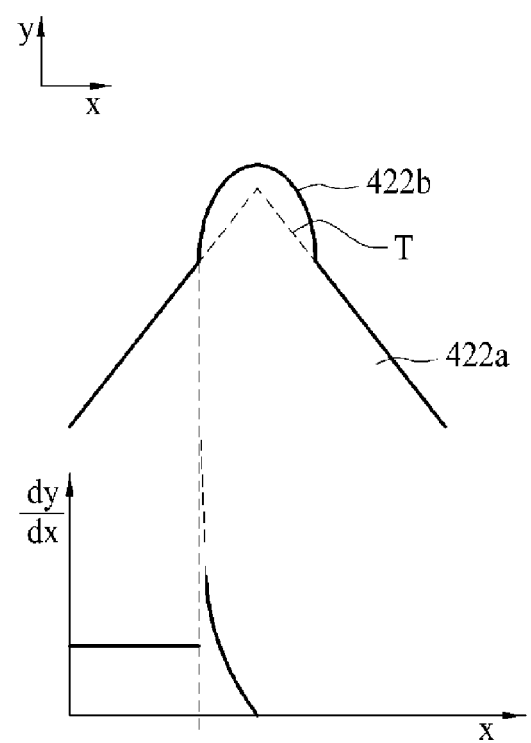

MULTILAYER OPTICAL SHEET MODULE

CROSS-REFERENCE TO RELATED APPLICATION

This application claims priority under 35 U.S.C. §119 from Korean Application No. 10-2011-0130995 filed Dec. 8, 2011 and Korean Application No. 10-2012-0068049 filed Jun. 25, 2012, the subject matter of which is incorporated herein by reference.

BACKGROUND

1. Field

Embodiments of the invention relate to a multilayer optical sheet module, more particularly, to a multilayer optical sheet module that improves durability by increasing an adhesive area and improves brightness simultaneously.

2. Background

A liquid crystal display device is a display device used in a notebook, a personal computer, a smart phone or a TV. With expanding demands for liquid crystal display devices, characteristics of liquid crystal display devices have been improved.

A liquid crystal panel of a liquid crystal display device as a non-luminous device requires a back light unit because of a structure. A back light unit consists of various optical systems and the back light unit uses an optical film having regular arrangement to improve brightness.

FIGS. 1A and 1B are a diagram schematically illustrating a structure of a conventional liquid crystal display.

As shown in FIG. 1A, a back light unit 10 includes a light source 1, a reflector 2, a light guide plate 3, a diffusion sheet 4, a first optical sheet 5 and a second optical sheet 6.

The light source 1 is a device for generate a visible light and a light emitting diode (LED) and a cold cathode fluorescent lamp (CCFL) may be used as such light source 1 selectively.

Light emitted from the light source 1 is incident on the light guide plate 3 and the light travels in the light guide plate 3, while generating full reflection. The light incident on a surface of the light guide plate 3 at a predetermined incidence angle smaller than a critical angle is not full-reflected but transmitted to be emitted upward and downward.

At this time, the reflector 2 reflects the light emitted downward and makes the light re-incident on the light guide plate 3, only to improve light efficiency.

The diffusion sheet 4 diffuses the light emitted via a top side of the light guide plate 3 and makes brightness uniform. The vertical brightness of the light passing through the diffusion sheet 4 might be deteriorated.

The first optical sheet 5 consists of a disposing part 5a and a structural pattern 5b. The first optical sheet refracts and concentrates the light incident from the diffusion sheet 4 so that the incident light enters vertically into a surface of a second optical sheet 6.

The structural pattern 5b is integrally formed with a top side of the disposing part 5a and has a structure in order to refract the light incident via the disposing part 5a in a vertical direction to the second optical sheet 6.

The structural pattern typically has a triangle cross section and a vertex of the triangle shape is approximately 90°.

The shape of the second optical sheet 6 is the same as that of the first optical sheet 5. The second optical sheet 6 secondarily concentrates the light to enhance the brightness of the light primarily concentrated by the first optical sheet 5 and it emits the secondarily concentrated light.

Here, the first optical sheet 5 and the second optical sheet 6 are arranged to make crossed at right angles an extension direction of the structural pattern provided in the first optical sheet 5 and an extension direction of the structural pattern provided in the second optical sheet 6. The first optical sheet 5 is integrally bonded with the second optical sheet 6 via an adhesion layer 6a coated on a back side of the disposing part provided in the second optical sheet 6.

Meanwhile, as shown in FIG. 1B, once the first optical sheet 5 and the second optical sheet 6 are layered vertically to be bonded to each other via the adhesion layer 6a coated on the back side of the second optical sheet 6, an apex portion 5c is partially embedded in the adhesion layer 6a and the structural pattern of the first optical sheet 5 is integrally bonded with the second optical sheet 6.

However, a bonding rigidity is determined by a bonding area in which the apex portion 5c is embedded and bonded in the adhesion layer 6a and such a bonding area of the apex portion 5c is limited. Accordingly, there was a problem of deteriorating the bonding rigidity.

Also the bonding rigidity between the first optical sheet 5 and the second optical sheet 6 was deteriorated, resulting in the separation between the first optical sheet 5 and the second optical sheet 6 thereby. Accordingly, there was another problem of deteriorating a product yield.

SUMMARY

Accordingly, the embodiments may be directed to a multilayer optical sheet module. To solve the problems, an object of the embodiments may be to provide a multilayer optical module that improves a bonding quality and durability by increasing a bonding area when a pair of optical sheets is bonded to each other and that minimizes brightness reduction generated by refraction of light in a bonding area.

To achieve these objects and other advantages and in accordance with the purpose of the embodiments, as embodied and broadly described herein, a multilayer optical sheet module includes an upper optical sheet comprising a first structural pattern projected upward; a lower optical sheet disposed under the upper optical sheet, the lower optical sheet comprising a second structural pattern projected toward the upper optical sheet; and an adhesion layer provided between the upper optical sheet and the lower optical sheet, wherein the second structural pattern includes a light transmitting part having a traverse cross section getting smaller along an upward direction; and an embedded part continuously connected to an upper portion of the light transmitting part, with a predetermined portion embedded in the adhesion layer, and a circumference of a cross section possessed by the embedded part, contacting with the adhesion layer, is larger than a circumference of a virtual cross section locus formed by extending the light transmitting part upward, with a continuous slope.

The second structural pattern may be formed to make a derived function of a cross section locus have at least one discontinuous point between a lowermost point and an uppermost point.

The discontinuous point may be positioned in a boundary point between cross section loci possessed by the embedded part and the light transmitting part, respectively.

A locus of a cross section locus possessed by the light transmitting part may be linear.

A locus of a cross section possessed by the embedded part, contacting with the light transmitting part, may be linear.

The embedded part may include a pair of extended surfaces extended from the light transmitting part upward; and a connected surface configured to connect the pair of the extended surfaces with each other.

The embedded part may be provided in a polygonal cross sectional shape having three or more contacting surfaces.

The connected surface may be a horizontal surface parallel to a back side of the lower optical sheet.

The connected surface may include at least one groove.

The connected surface may be surface-treated to have a predetermined roughness.

The extended surface may be vertically extended from a lower horizontal surface parallel to a back side of the lower optical sheet, and the lower horizontal surface may be horizontally extended from an end of the light transmitting part.

The embedded part may include a pair of extended surface extended from the light transmitting part inclined in an upward direction, and upper ends of the extended surfaces may meet each other.

An uppermost point of the embedded part may contact with a back side of the upper optical sheet.

The second structural pattern may be extended along a traverse direction, with a uniform cross section shape.

The upper optical sheet and the lower optical sheet may be arranged to make an extension direction of the first structural pattern and an extension direction of the second structural pattern intersect each other.

The multilayer optical sheet module may further includes a reflective polarizer disposed on the lower optical sheet or the upper optical sheet to selectively transmit light based on a wavelength of the light transmitted from a lower portion.

The adhesion layer may be formed on a back side of the upper optical sheet or a top side of the lower optical sheet facing the back side of the upper optical sheet, in a dotted shape.

The adhesion layer may be formed in a surface of the second structural pattern possessed by the lower optical sheet or a back side of the upper optical sheet facing the second structural pattern, in a linear shape.

The adhesion layer may be formed in a surface of the second structural pattern possessed by the lower optical sheet or a back side of the upper optical sheet facing the second structural pattern, in a mesh shape having a plurality of open areas.

In another aspect of the present invention, a multilayer optical sheet module includes an upper optical sheet comprising a first structural pattern projected upward; a lower optical sheet disposed under the upper optical sheet, the lower optical sheet comprising a second structural pattern projected toward the upper optical sheet; and an adhesion layer provided between the upper optical sheet and the lower optical sheet, wherein the second structural pattern having a traverse cross section getting smaller along an upward direction includes one or more discontinuous point having a slope discontinuously increasing between a lowermost point and an uppermost point.

A refraction rage of the second structural pattern may be larger than a refraction rate of the adhesion layer.

The second structural pattern may include a light transmitting part not embedded in the adhesion layer, with a predetermined slope; and an embedded part extended toward a top side of the light transmitting part, with a predetermined portion embedded in the adhesion layer.

The embedded part may include at least two extended surfaces extended upward.

The embedded part may include a pair of extended surfaces extended upward, and a cross section of the embedded part may be formed in a triangle shape by the extended surfaces.

The height of the embedded part may be the same as or smaller than the thickness of the adhesion layer.

In a further aspect of the present invention, a multilayer optical sheet module includes an upper optical sheet comprising a first structural pattern projected upward; a lower optical sheet disposed under the upper optical sheet, the lower optical sheet comprising a second structural pattern projected toward the upper optical sheet; and an adhesion layer provided between the upper optical sheet and the lower optical sheet, wherein the second structural pattern having a traverse cross section getting smaller along an upward direction includes a light transmitting part having a linear cross section; and an embedded part having a linear shape connected to the light transmitting part inclined in an upward direction.

The embedded part may include a pair of extended surface extended from the light transmitting part inclined in an upward direction, and upper ends of the extended surfaces may meet each other.

A cross section of the embedded part may be formed in a triangle shape.

The multilayer optical sheet module may further include a reflective polarizer disposed on the lower optical sheet or the upper optical sheet to selectively transmit light based on a wavelength of the light transmitted from a lower portion.

In a still further aspect of the present invention, a multilayer optical sheet module includes an upper optical sheet comprising a first structural pattern projected upward; a lower optical sheet disposed under the upper optical sheet, the lower optical sheet comprising a second structural pattern projected toward the upper optical sheet; and an adhesion layer provided between the upper optical sheet and the lower optical sheet, and the second structural pattern having a plurality of patterns, which partially has a traverse cross section area getting smaller along an upward direction, includes one or more discontinuous point having a discontinuously increasing slope between a lowermost point and an uppermost point.

The distance from the uppermost point to the lowermost point possessed by one pattern may be longer than the distance possessed by a neighboring pattern in the second structural pattern.

Patterns having different shapes may be repeatedly arranged in the second structural pattern.

The second structural pattern may include a light transmitting part having a traverse cross section getting smaller along an upward direction; and an embedded part continuously connected to an upper portion of the light transmitting part, with a predetermined portion embedded in the adhesion layer.

A circumference of a cross section possessed by the embedded part, contacting with the adhesion layer, may be larger than a circumference of a virtual cross section locus formed by extending the light transmitting part upward, with a continuous slope.

A refraction rage of the second structural pattern may be larger than a refraction rate of the adhesion layer.

The embodiments have following advantageous effects.

First of all, according to the present invention, the structural pattern embedded in the adhesion layer disposed between the upper optical sheet and the lower optical sheet may be optimized and the bonding area with the adhesion layer may be increased. Accordingly, the bonding area between the embedded part and the adhesion layer is maximized to enhance the bonding quality. As a result, the durability of the optical sheet module can be enhanced.

Especially, the slopes possessed by the light transmitting part and the embedded part composing the structural pattern provided in the lower optical sheet are discontinuously connected. While maintaining the thickness of the adhesion layer uniform, the bonding area with the adhesion layer can be maximized.

Furthermore, the embedded part is inclined in an upward direction to have a larger inclination angle than an inclination angle of the light transmitting part, in a triangle shape. Even the portion of the embedded part embedded in the adhesion layer can refract the light incident thereon and concentrate the refracted lights. Accordingly, the brightness of the optical sheet can be enhanced.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein:

FIG. 12 is a diagram illustrating a position of a point where the derived function of the cross sectional locus in the second structural pattern is discontinuous;

FIG. 13 is a diagram illustrating an embodiment showing that a cross section locus of the light transmitting part is linear in the second structural pattern of FIG. 2;

DETAILED DESCRIPTION

Preferred embodiments of the present invention will be described, referring to the accompanying drawings as follows. However, the embodiments are not to limit the present invention but to make the present invention understood more clearly.

Reference may now be made in detail to specific embodiments, examples of which may be illustrated in the accompanying drawings. Wherever possible, same reference numbers may be used throughout the drawings to refer to the same or like parts.

First of all, referring to FIGS. 2 and 3, a schematic structure of a multilayer optical sheet module according to one embodiment of the present invention will be described as follows.

Figure 1A:
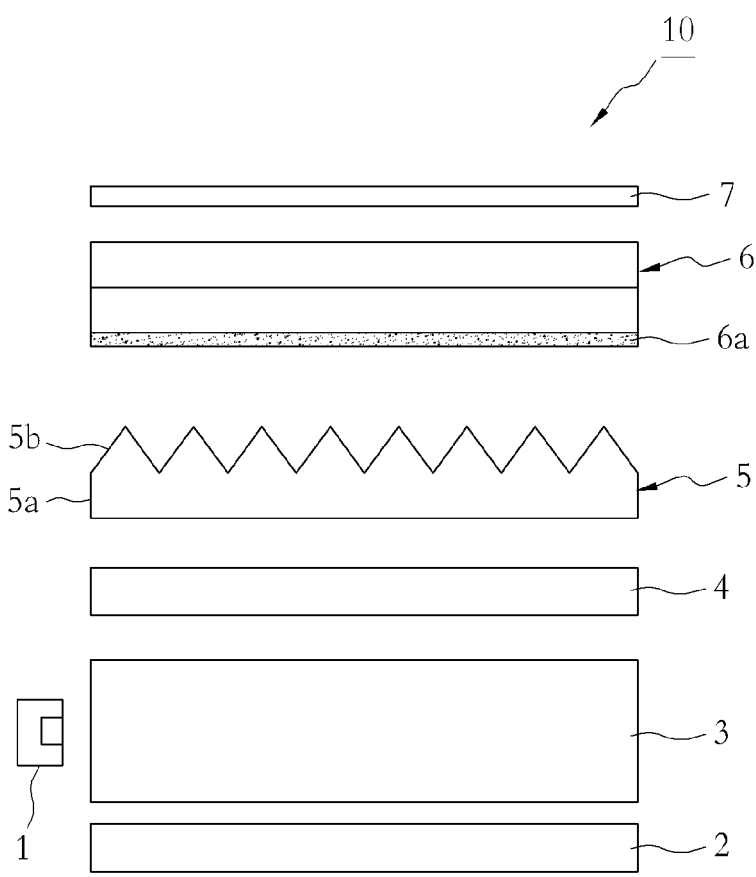
FIGS. 1A and 1B are diagrams schematically illustrating a structure of a conventional liquid crystal display device.
Figure 1B:
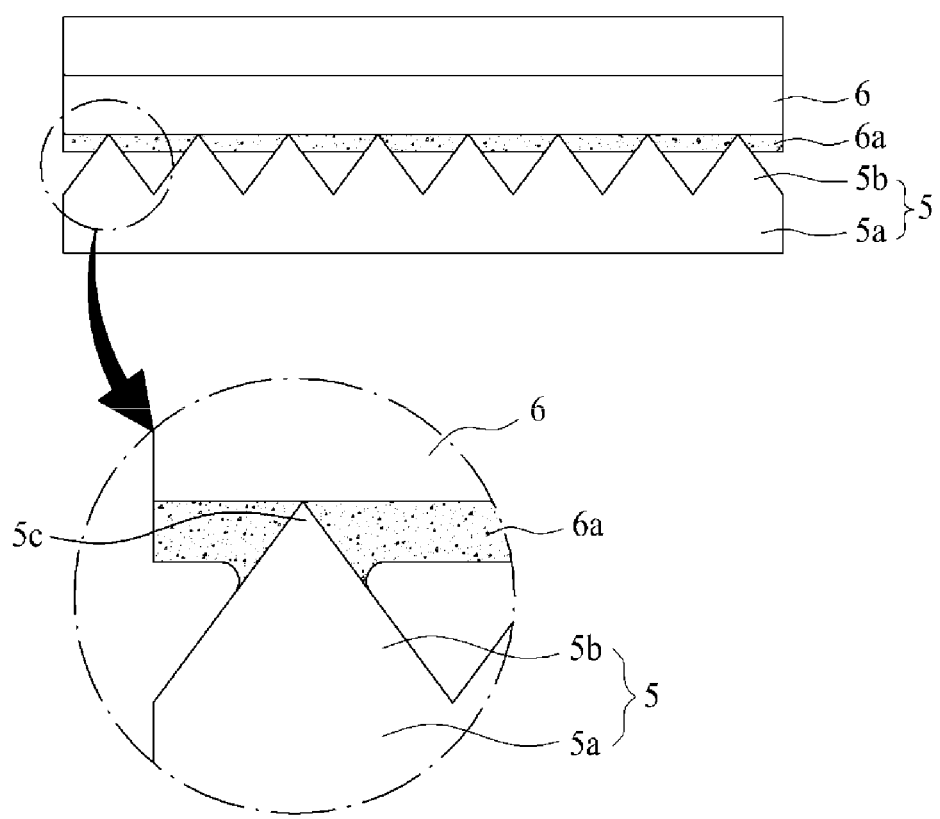
Figure 2:
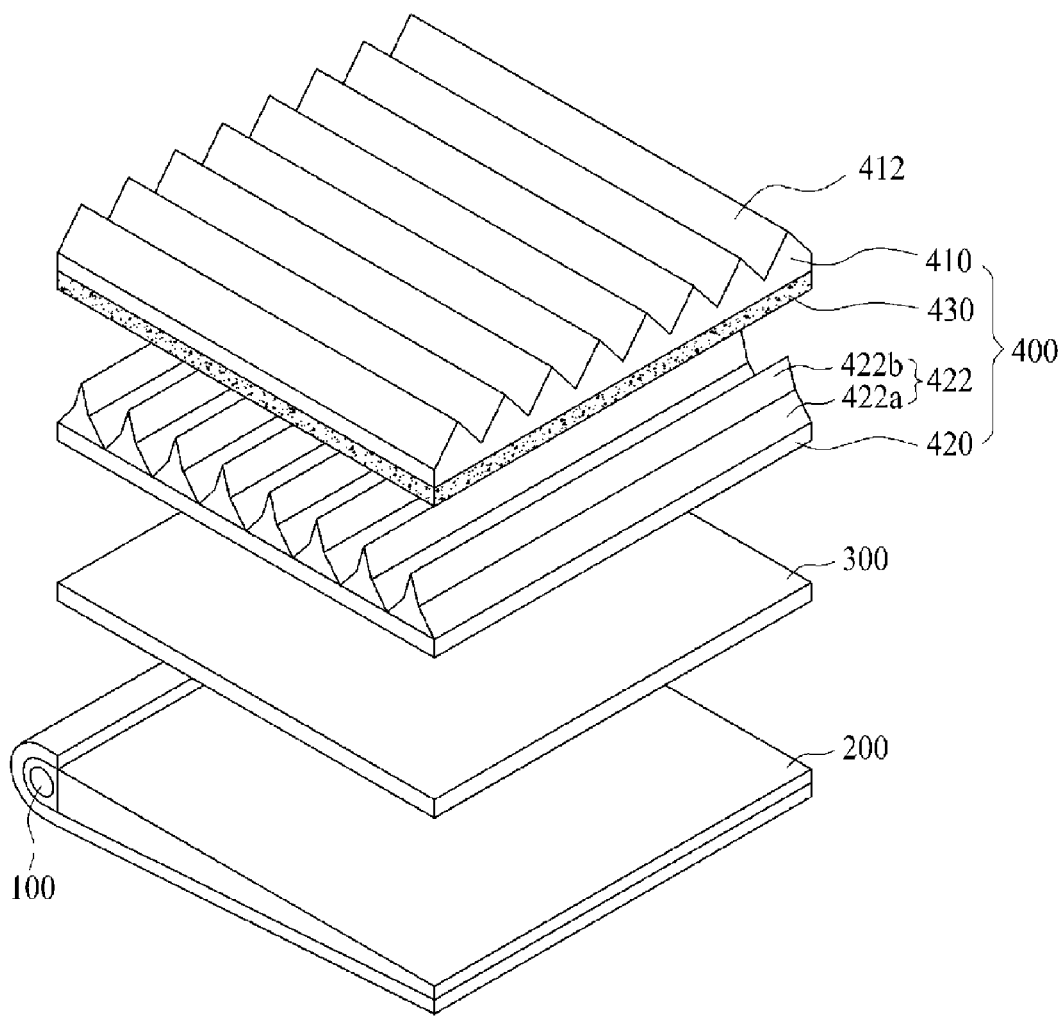
FIG. 2 is a perspective view illustrating a schematic structure of a multilayer optical sheet module according to one embodiment of the present invention.

FIG. 2 is a perspective view illustrating a schematic structure of a multilayer optical sheet module according to one embodiment of the present invention. FIG. 3 is a diagram illustrating a shape of a second structural pattern provided in the optical sheet module of FIG. 2.

The multilayer optical sheet module according to this embodiment of the present invention may be applicable to various fields for changing a passage of light. The multilayer optical sheet module according to this embodiment is applied to a liquid crystal display device, for example.

Figure 3:
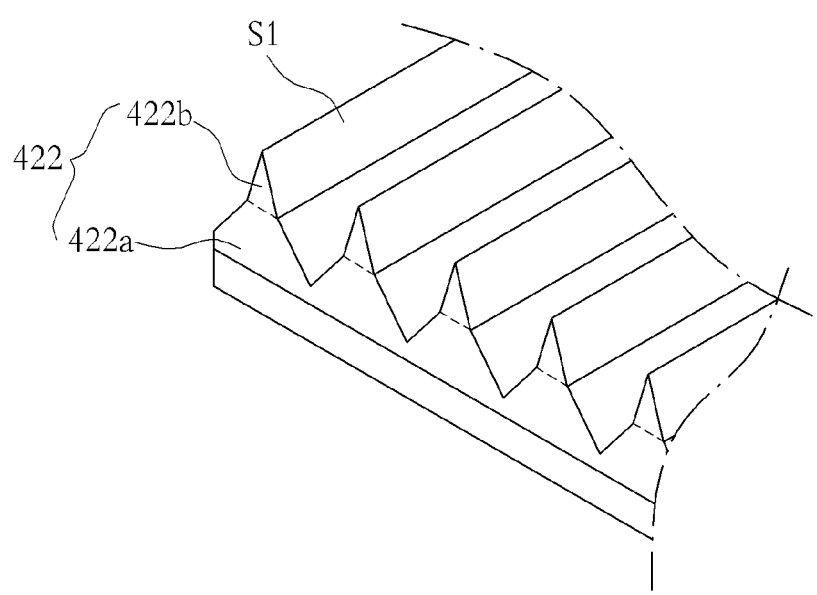
FIG. 3 is a diagram illustrating a shape of a second structural pattern provided in the optical sheet module of FIG. 2.

As shown in the FIGS. 2 and 3, the liquid crystal display device necessarily includes a back light unit (BLU) configured to provide light to a liquid crystal panel. The back light unit consists of a light source 100, a light guide plate 200, a diffusion sheet 300 and a multilayer optical sheet module 400.

The light source 100 is typically configured of a luminous body that emit light and it emits light from a lateral side of the light guide plate 200 to transmit the light toward the light guide plate 200.

The light guide plate 200 reflects and scatters the light emitted from the light source 100, to transmit the reflected and scattered light to the diffusion sheet 300. The diffusion sheet 300 is arranged on the light guide plate 200 and it diffuses the lights transmitted from the light guide plate 200 and uniformly transmits the diffused light in a direction of the multilayer optical sheet module 400.

The multilayer optical sheet module 400 is arranged on the diffusion sheet 300 and it concentrates and moves the transmitted lights upward. The multilayer optical sheet module 400 is typically configured of a pair of upper and lower optical sheets 410 and 420.

The lights are concentrated and refracted in an orthogonal direction with respect to a surface of the optical sheet module 400 by structural patterns formed in the upper and lower optical sheets 410 and 420.

The multilayer optical sheet module 400 will be described in detail. The multilayer optical sheet module 400 consists of the upper optical sheet 410, the lower optical sheet 420 and an adhesion layer 430.

The upper optical sheet 410 has a first structural pattern 412 projected from a top side thereof, with a smaller traverse cross section area along an upward direction.

The upper optical sheet 410 refracts and concentrates the lights transmitted by the first structural pattern 412 there below, only to emit the refracted and concentrated lights upward. Typically, the first structural pattern 412 has a plurality of triangle-shaped prisms extended along one direction.

The adhesion layer 430 is provided under the upper optical sheet 410 to make the upper and lower optical sheets 410 and 420 bonded to each other. At this time, the adhesion layer 430 may be formed of a predetermined material having a high light transmittance to transmit the lights transmitted from the diffusion sheet 300.

Here, the thickness of the adhesion layer 430 may be approximately 0.1 μm~50 μm and the adhesion layer 430 may be formed of polymer resin having one or more of acrylic, polyester, polycarbonate polymer resin.

The lower optical sheet 420 may be arranged under the upper optical sheet 410 and a second structural pattern 422 is formed on a top side of the lower optical sheet 420.

The second structural pattern 422 includes a light transmitting part 422a having a gradually smaller traverse cross section area along an upward direction and an embedded part 422b continuously connected with the light transmitting part 422a, with a predetermined portion embedded in the adhesion layer 430.

The light transmitting part 422a is exposed to external air, not embedded in the adhesion layer 430, to transmit the lights transmitted from the diffusion sheet 300 upward.

The embedded part 422b is connected to an upper portion of the light transmitting part 422a and a circumference of a cross section locus in contact with the adhesion layer 430 is larger than a circumference of a virtual cross section locus (T) extended with a continuous slope.

The embedded part 422b may be formed in various types and the embedded part 422b according to this embodiment includes a pair of extended surfaces S1 extended obliquely in an upward direction from the light transmitting part 422a. Upper ends of the extended surface S1 meet each other.

As shown in FIG. 3, the second structural pattern 422 including the embedded part 422b and the light transmitting part 422a is projected upwardly, with a smaller and smaller traverse area along an upward direction, and a slope of the embedded part 422b is more upwardly-steep than a slope of the light transmitting part 422a.

The cross section locus of the light transmitting part 422a may be linear and the cross section locus of a contacting area of the embedded part 422b with the adhesion layer 430 may be linear. The embedded part 422b is formed in a triangle shape, with a pair of extended surfaces S1. However, the shape of the embedded part 422a shown in the drawings is not limited to the triangle shape and the triangle shape is selected to make the structure according to this embodiment understood easily.

The upper and lower optical sheets 410 and 420 include the first structural pattern 412 and the second structural pattern 422 extended along a traverse direction, with the same cross section area, respectively. The first and second structural patterns 412 and 422 are bonded to make extension directions of the first and second structural patterns 412 and 422 intersect.

At this time, the extension direction of the first structural pattern 412 and the extension direction of the second structural pattern 422 may intersect at various angles. In one embodiment, they may intersect at 90°.

Next, referring to FIG. 4, the bonded state between the upper optical sheet 410 and the lower optical sheet 420 bonded by the adhesion layer 430 will be described as follows.

Figure 4:
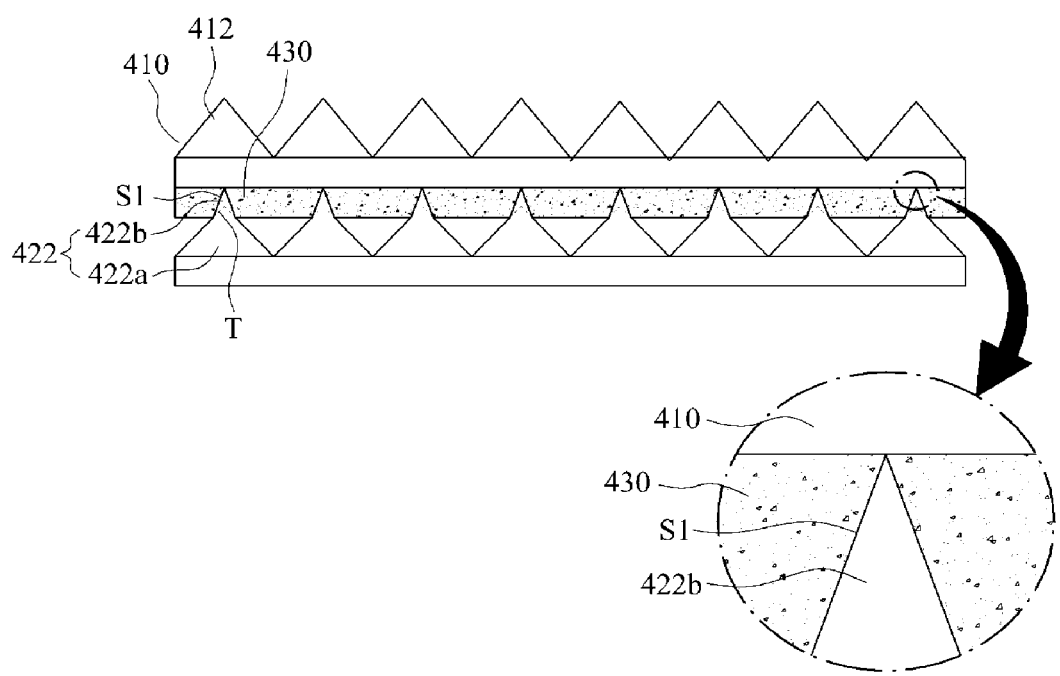
FIG. 4 is a sectional view illustrating a coupled state between an upper optical sheet and a lower optical sheet shown in FIG. 2.

FIG. 4 is a sectional diagram illustrating the bonded state between the upper optical sheet 410 and the lower optical sheet 420 shown in FIG. 2.

As shown in FIG. 4, the lower optical sheet 420 positioned under the upper optical sheet 410 is bonded to the upper optical sheet 410 by the adhesion layer 430. The embedded part 422b is embedded in the adhesion layer 430 and an uppermost point of the embedded part 422b may be in contact with a back side of the upper optical sheet 410.

When the uppermost point of the embedded part 422b contacts with the back side of the upper optical sheet 410, the distance in which the light emitted from the embedded part 422b passes through the adhesion layer 430 is getting shorter. Accordingly, the brightness reduction generated by the adhesion layer 430 can be minimized.

The light refraction performed in the embedded part 422a will be described later, referring to FIG. 10.

Meanwhile, as shown in the drawing, the embedded part 422b is embedded in the adhesion layer 430 and the circumference length of the cross section area contacting with the adhesion layer 430 is larger than a virtual cross section locus (T) formed by the extension of the light transmitting part 422a, with a continuous slope.

As the circumference of the embedded part 422b is getting larger than the circumference of the virtual cross section locus (T) of the light transmitting part 422a, the area contacting with the adhesion layer 430 is getting larger and the bonding quality between the upper optical sheet 410 and the lower optical sheet 420 may be improved.

Meanwhile, the adhesion layer 430 may be formed in an overall area of the back side of the upper optical sheet 410 facing the second structural pattern 422, with a predetermined thickness. It may be provided in a predetermined portion of the back side.

The adhesion layer 430 is dispersedly coated on the back side of the upper optical sheet 410, corresponding to the second structural pattern 422, or the top side of the lower optical sheet 420 facing the back side of the upper optical sheet 410, in a doted type. The lower optical sheet 420 and the upper optical sheet 410 may be partially bonded to each other via the dotted-shape adhesion layer 430.

Moreover, the adhesion layer 430 may be linearly formed on the back side of the upper optical sheet 410 facing the second structural pattern 422 or the top side of the lower optical sheet 420 facing the back side of the upper optical sheet 410. Accordingly, the lower optical sheet 40 and the upper optical sheet 410 may be partially bonded to each other via the linear adhesion layer 430.

The adhesion layer 430 may be formed on the back side of the upper optical sheet 410 facing the second structural pattern 422 or the top side of the lower optical sheet 420 facing the back side of the upper optical sheet 410, in a mesh type to have a plurality of open areas. Accordingly, the lower optical sheet 420 and the upper optical sheet 410 may be partially bonded to each other via the mesh type adhesion layer 430.

The adhesion layer 430 may be formed in various shapes and the shape of the adhesion layer is not limited to a specific shape.

Next, referring to FIG. 5, the cross section locus of the second structural pattern 422 will be described as follows.

Figure 5:
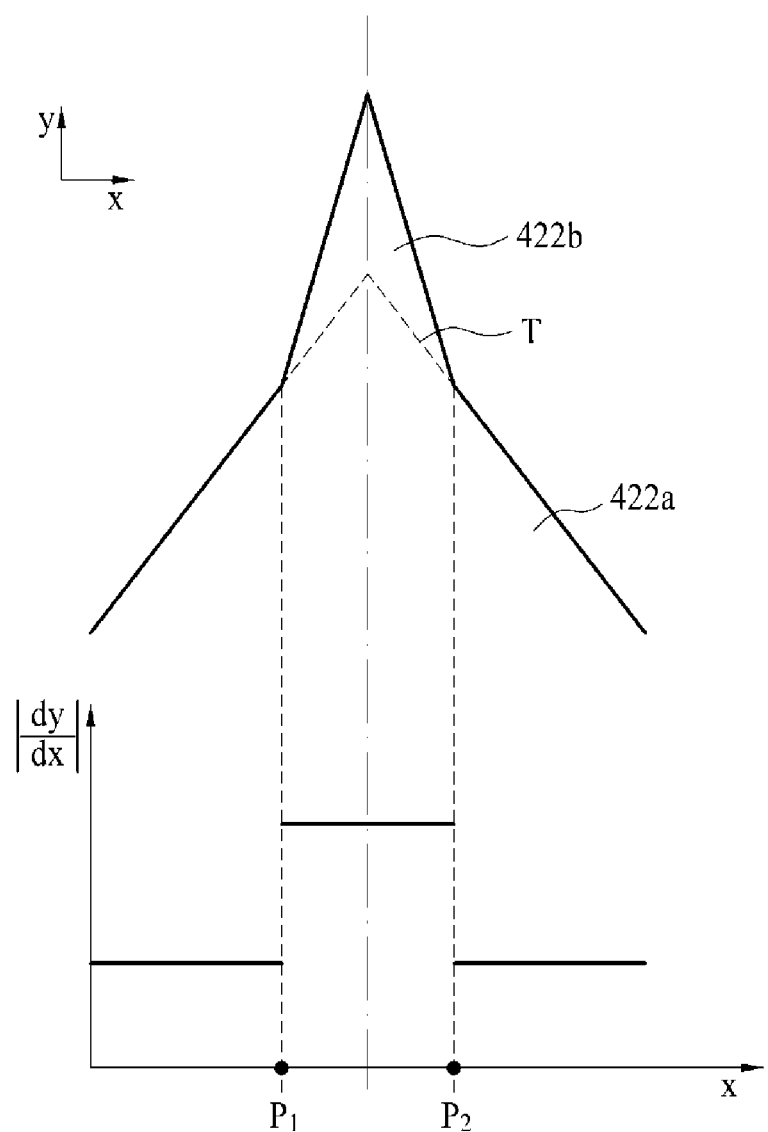
FIG. 5 is a diagram illustrating a cross-sectional lotus of the second structural pattern shown in FIG. 2 and a derived function of the cross sectional locus.

FIG. 5 is a diagram illustrating a cross section lotus of the second structural pattern shown in FIG. 2 and a derived function of the cross section locus.

The second structural pattern 422 may be formed in various shapes and a derived function of a cross section locus between lowermost and uppermost points of the second structural pattern may have at least one discontinuous point (P1 and P2).

As shown in FIG. 5, the second structural pattern 422 is projected upward, with a gradually decreasing traverse area along an upward direction. Here, the second structural pattern 422 is projected upward, with a predetermined slope. The second structural pattern 422 has a gradually increasing traverse cross section area along an upward direction and an upper slope is larger with respect to an upward direction than a lower slope.

At this time, the upper and lower slopes of the second structural pattern 422 are changed at the discontinuous points P1 and P2.

The discontinuous points P1 and P2 are points where the derived function of the locus according to the cross section area of the second structural pattern 422 is discontinuous.

In a cross section locus derived function of the second structural pattern 422 shown in FIG. 5, a graph is not continuous along x-axis uniformly and there are discontinuous points generated at P1 and P2.

Accordingly, the cross section locus derived function of the second structural pattern 422 is formed discontinuously and slopes of the light transmitting part 422a and the embedded part 422b are different from each other. The shape of the embedded part 422b embedded in the adhesion layer 430 and the shape of the light transmitting part 422a may be different.

Figure 6A:
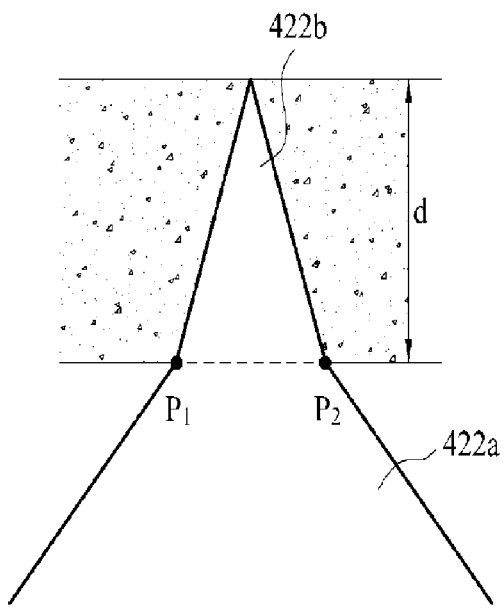
FIG. 6 is a diagram illustrating comparison of an embedded part embedded in an adhesion layer in the second structural pattern of FIG. 2.
Figure 6B:
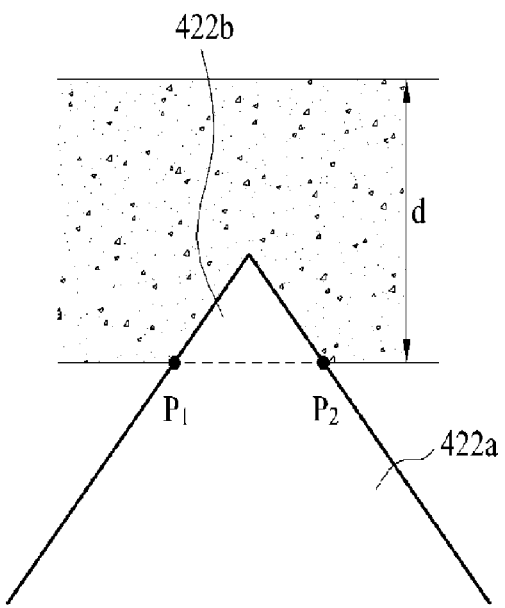
Figure 7:
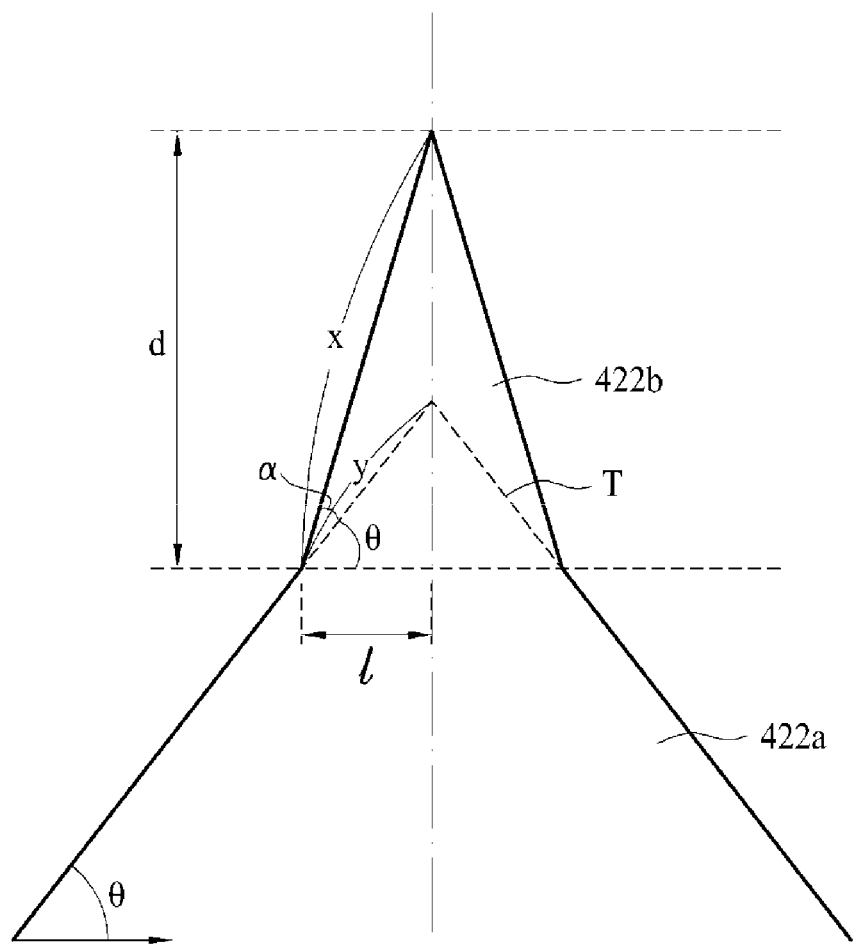
FIG. 7 is a diagram illustrating a difference of lengths of circumferences of the second structural pattern in contact with the adhesion layer in the adhesion layer of FIG. 6.

Referring to FIGS. 6 and 7, a difference of circumferences at bonded points according to the shape of the embedded part 422b embedded in the adhesion layer 430 will be described as follows.

FIG. 6 is a diagram illustrating comparison of the embedded part 422 embedded in the adhesion layer 430 in the second structural pattern 422 of FIG. 2. FIG. 7 is a diagram illustrating a difference of lengths of circumferences of the second structural pattern 422 in contact with the adhesion layer 430 in the adhesion layer of FIG. 6.

FIG. 6 (a) is a diagram illustrating a state where the second structural pattern 422 is bonded by the adhesion layer 430 according to the embodiment of the present invention. The second structural pattern 422 includes the light transmitting part 422a and the embedded part 422b embedded in the adhesion layer 430. The slope of the cross section locus of the embedded part 422b is larger with respect to an upward direction than the slope of the cross section locus of the light transmitting part 422a.

FIG. 6(b) shows the embedded part 422b extended with a continuous slope with the light transmitting part 422a to form a virtual cross section locus (T). The embedded part 422b and the light transmitting part 422a have the cross section locus with an uniform slope and the embedded part 422b is embedded in the adhesion layer 430.

Comparing FIG. 6 (a) and (b) with each other, the embedded part 422b having the same thickness (d) is embedded in the adhesion layer 430. FIG. 6 (a) has a larger circumference of a cross section area contacting with the adhesion layer 430 and the embedded part 422b. As the circumference of the cross section area contacting with the adhesion layer 430 is increased, the bonding area is increased and the bonding quality is improved accordingly.

Specifically, referring to FIG. 7, the circumference of the contacting cross section area between the embedded part 422b and the adhesion layer 430 having the same thickness (d) shown in FIGS. 6 (a) and 6 (b) will be described specifically via a mathematical formula as follows.

In FIG. 6 (a), a cross section locus length of the contacting portion between the embedded part 422b and the adhesion layer 430 may refer to '$2_x$' and a slope angle of the light transmitting part 422a may refer to '$\theta$'. As the embedded part 422b is sloped as upwardly as '$\alpha$', an inclination angle of the embedded part 422b is $\theta+\alpha$. Accordingly, the length of the contacting area between the embedded part 422b and the adhesion layer 430 can be calculated based on a following mathematical formula:

$$\cos(\theta + \alpha) = \frac{l}{x}, x = \frac{l}{\cos(\theta + \alpha)} \qquad \text{[Mathematical Formula 1]}$$

As shown in Mathematical Formula 1, in case the embedded part 422b is formed as shown in FIG. 6 (a), $$x = \frac{l}{\cos(\theta + \alpha)}.$$

Hence, the cross section locus length of the contacting area between the embedded part 422b and the adhesion layer 430 may refer to '2y' and the slope of the light transmitting part 422a and the embedded part 422b may refer to '$\theta$'. Here, the cross section locus of the embedded part 422b has a virtual cross section locus (T) formed by extending the light transmitting part 422a upwardly. Accordingly, the length of the contacting area between the embedded part 422b and the adhesion layer 430 is calculated according to a following mathematical formula:

$$\cos\theta = \frac{l}{y}, y = \frac{l}{\cos\theta} \qquad \text{[Mathematical Formula 2]}$$

As shown in Mathematical Formula 2, in case the embedded part 422b is formed to have the virtual cross section locus (T) of the light transmitting part 422a, $$y = \frac{l}{\cos\theta}.$$

Accordingly, comparison between 2x and 2y as the length of the contacting area between the embedded part 422b having the actual cross section locus and the adhesion 430 and the length of the contacting area between the embedded part 422b having the virtual cross section locus (T) and the adhesion layer 430 is shown in a following mathematical formula:

$$2(x-y) = 2l\left(\frac{1}{\cos(\theta+\alpha)} - \frac{1}{\cos\theta}\right) > 0 \qquad \text{[Mathematical Formula 3]}$$

Here, a slope possessed by the cross section locus of the embedded part 422b is 90° or less and accordingly $\cos\theta > \cos(\theta+\alpha)$ and x>y.

As a result, the slope of the cross section locus possessed by the embedded part 422b is more inclined upward than the slope of the cross section locus possessed by the light transmitting part 422a as shown in FIG. 6 (*a*), and accordingly, the circumference of the contacting area between the embedded part 422b and the adhesion layer 430 is relatively large.

Referring to FIGS. 6 and 7, the contacting area between the embedded part 422b and the adhesion layer 430 is increasing based on the shape of the embedded part 422b. Accordingly, the upper optical sheet 410 and the lower optical sheet 420 may be bonded to each other more effectively.

Here, the cross section locus of the first and second structural patterns 412 and 422 may be substantially curved not linear. Also, lower ends, upper ends and areas having a discontinuous derived function of the cross section locus possessed by the first structural pattern 412 and the second structural pattern 422 may be rounded or incomplete. Accordingly, it is difficult to measure the inclination angle of the cross section locus possessed by the first structural pattern 412 and the second structural pattern 422.

The shapes of the points mentioned above can be changed when the upper optical sheet 410 and the lower optical sheet 40 are bonded. Accordingly, the cross sectional locus of the first structural pattern 412 and the cross section locus of the second structural pattern 422 may be changed.

It is difficult to measure the inclination angle of the cross section locus of the first structural pattern 412 and the second structural pattern 422. Accordingly, an average inclination angle is calculated to determine the inclination angle of the cross section locus possessed by the first structural pattern 412 and the second structural pattern 422.

The average inclination angle of the first and second structural patterns 412 and 422 is calculated by measuring an average inclination angle of an area concentrating the lights by using an inclined surface of the other area except the points mentioned above in the cross section locus of the first and second structural patterns 412 and 422. The measured average inclination angle is used in adjusting the inclination angles of the first and second structural patterns 412 and 422.

Especially, an inclination angle of a cross section locus possessed by the light transmitting part 422a is different from an inclination angle of a cross section locus possessed by the embedded part 422b in the second structural pattern 422. Accordingly, an average inclination angle of a cross section locus in the other area except the lower end of the light transmitting part 422a and the upper end thereof connected with the embedded part 422b may be measured to determine the inclination angle of the light transmitting part 422a. likewise, an average inclination angle of a cross section locus in the other areas except the upper end of the embedded part 422a bonded to the back side of the upper optical sheet 410 and the lower end thereof connected with the light transmitting part 422a may be measured to determine the inclination angle of the embedded part 422a.

For example, after the light transmitting part 422a is divided into three equal parts, a central part is used in calculate an average inclination angle. In other words, the central part is re-divided into middle-and-small length units and a slope of each middle-and-small length area is calculated after that. An average of the calculated slopes is calculated and an average inclination angle can be calculated based on the average slope. The calculated average inclination angle of the central part may be determined as an average angle of an inclined surface possessed by the light transmitting part 422a. In this instance, the central part is set as one area, without dividing the central part into the plurality of middle-and-small units. A slope of the area is calculated and the calculated slope can be determined as an average inclination angle.

Through this method, the average inclination angle is calculated to adjust the inclination angle of the cross section locus, in case the cross section locus of the first structural pattern 412 and the second structural pattern 422 is not linear.

Figure 8A:
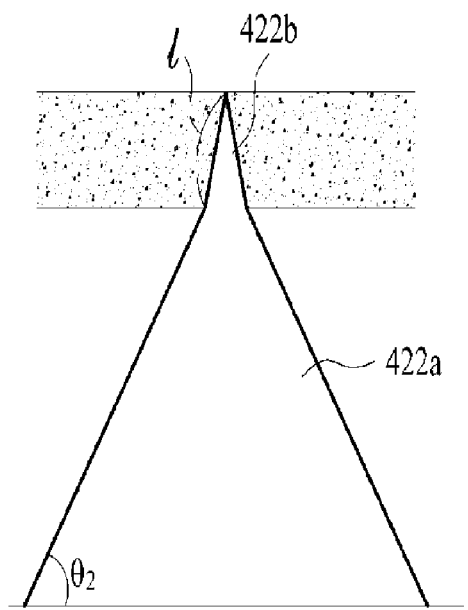
FIG. 8 is a diagram illustrating comparison of a light transmitting part of the second structural pattern of FIG. 2, which is not embedded in the adhesion layer.
Figure 8B:
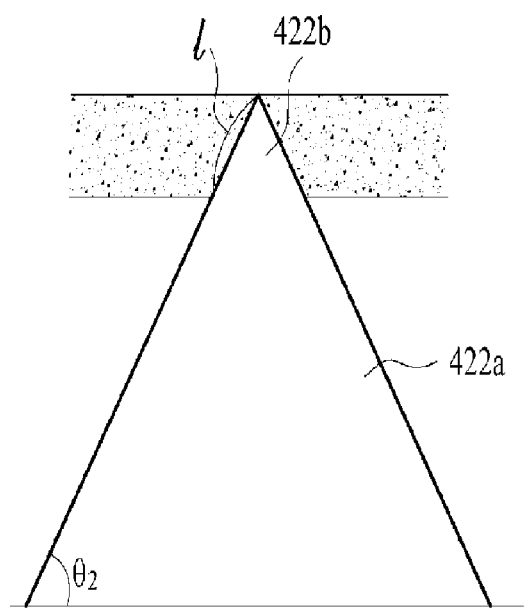
Figure 9:
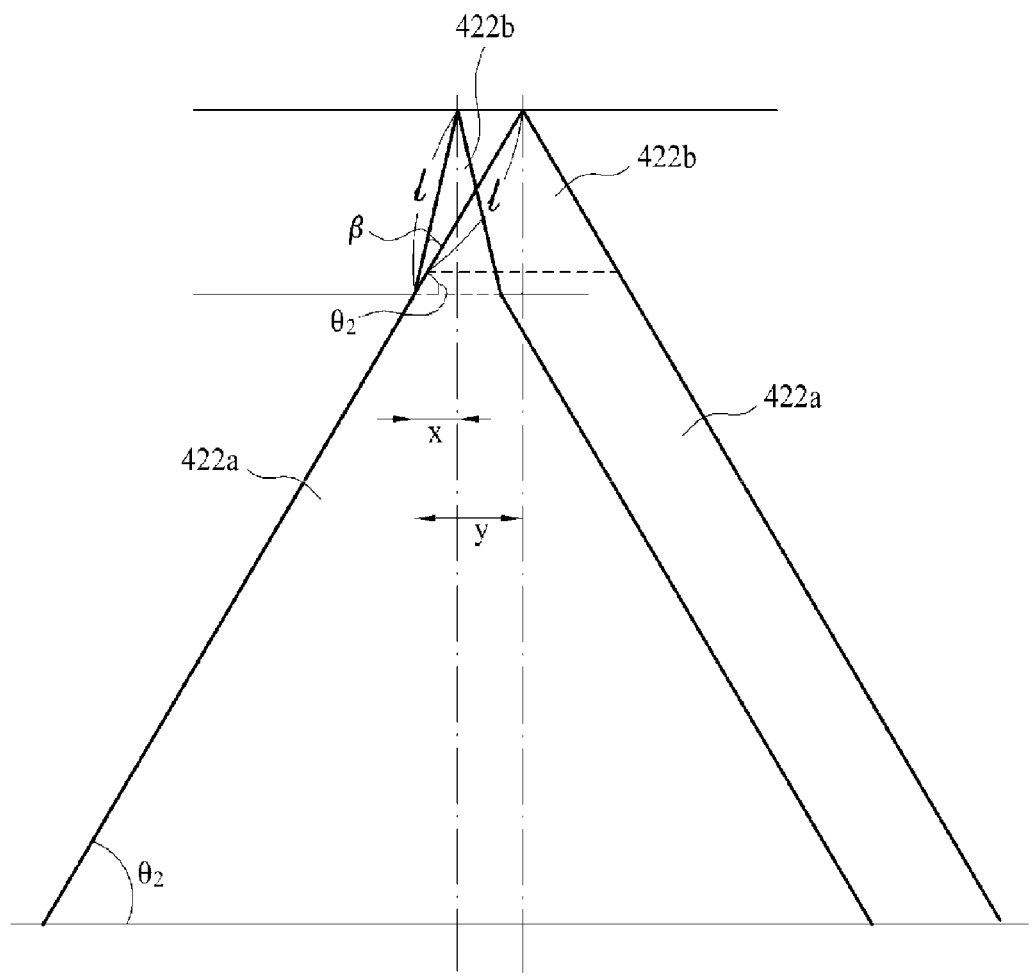
FIG. 9 is a diagram illustrating a difference of traverse lengths of the light transmitting part shown in FIG. 8.

Referring to FIGS. 8 and 9, the traverse widths at a boundary area between the light transmitting part 422a and the embedded part 422b will be compared, when the embedded parts 422 have the same cross section.

FIG. 8 is a diagram illustrating comparison of the light transmitting part 422a of the second structural pattern 422 of FIG. 2, which is not embedded in the adhesion layer 430. FIG. 9 is a diagram illustrating a difference of traverse lengths of the light transmitting part 422a shown in FIG. 8.

As shown in FIG. 8, the embedded part 422b is embedded in the adhesion layer 430. FIG. 8 (*a*) is a diagram illustrating a state of the second structural pattern according to one embodiment of the present invention that is bonded by the adhesion layer 430. The second structural pattern 422 includes the light transmitting part 422a and the embedded part 422b having the slope of the cross section locus that is larger in an upward direction than the slope of the cross section locus possessed by the light transmitting part 422a. The embedded part 422b is embedded in the adhesion layer 430.

FIG. 8 (*b*) shows that the embedded part 422b includes a virtual cross section locus (T) extended upward with a continuous slope the light transmitting part 422a. Each of the embedded part 422b and the light transmitting part 422a has the cross section locus having a uniform slope, such that the embedded part 422b may be embedded in the adhesion layer 430.

Here, the embedded part 422b of FIGS. 8 (*a*) and (*b*) may be embedded in the adhesion layer 430, to make a locus of a cross section thereof contacting with the adhesion layer 430 uniform.

However, in a boundary area between the light transmitting part 422a and the embedded part 422b shown in FIG. 8 (*a*), the traverse direction width of the boundary point is relatively narrow than the width of the boundary point between the light transmitting part 422a and the embedded part 422b.

When the traverse direction width of the boundary between the light transmitting part 422a and the embedded part 422b is narrow, more lights transmitted from the diffusion sheet 300 can be concentrated and the area in which the lights are re-transmitted upward can be enlarged. Such the area capable of concentrating the lights is enlarged and light uniformity and brightness are improved as much as the enlarged area accordingly, only to improve the effect of the multilayer optical sheet module 400.

Specifically, referring to FIG. 9, the traverse direction width of the boundary point between the light transmitting part 422a and the embedded parts 422b shown in FIG. 8 (*a*) and FIG. 8 (*b*), respectively, in a state of being embedded in the adhesion layer 430 to have the same bonding area will be described in detail based on following mathematical formulas.

First of all, the traverse direction width of the boundary point between the embedded part 422b and the light transmitting part 422a may refer to '2x' and an inclination angle of the light transmitting part 422a may refer to 'θ'. The embedded part 422b is as inclined upward as 'β', compared with the light transmitting part 422a. accordingly, the inclination angle of the embedded part 422b is 'θ+β' and the traverse direction width of the boundary point between the embedded part 422b and the light transmitting part 422a has a following mathematical formula:

$$\cos(\theta+\beta) = \frac{x}{l}, x = l\cos(\theta+\beta)$$ [Mathematical Formula 4]

As shown in Mathematical Formula 4, in case the embedded part 422b is formed as shown in FIG. 8 (a), x=l cos(θ+β) can be created.

Next, the traverse direction width of the boundary point between the light transmitting part 422a and the embedded part 422b in the type shown in FIG. 8 (b) may refer to '2y' and a slope of the light transmitting part 422a and the embedded part 422b is 'θ'.

Here, a cross section locus of the embedded part 422b has a virtual cross section locus (T) formed by extending the light transmitting part 422a upward. Under this condition, the traverse direction width of the boundary point between the light transmitting part 422a and the embedded part 422b can be calculated based on Mathematical Formula 5 as follows:

$$\cos\theta = \frac{y}{l}, y = l\cos\theta$$ [Mathematical Formula 5]

As shown in Mathematical Formula 5, in case the embedded part 422b is formed with the virtual cross section locus (T) of the light transmitting part 422a, y=l cos θ can be calculated.

Accordingly, Mathematical Formula 6 can be created from comparison between 2x and 2y, namely, between the traverse direction width of the boundary point between the light transmitting part 422a and the embedded part 422b having the substantial cross section locus and the traverse direction with of the boundary point between the light transmitting part 422a and the embedded part 422b having the virtual cross section locus, using Mathematical Formula 5 and Mathematical Formula 6:

$$y-x=l(\cos\theta-\cos(\theta+\beta))>0, y>x$$ [Mathematical Formula 6]

Here, the slope of the cross section locus possessed by the embedded part 422b is 90° or less and it is cos θ>cos(θ+β) and y>x.

Based on such the result, when the embedded part 422b is formed more inclined upwardly than the slope of the cross section locus of the light transmitting part 422a, in a state of the same bonding area of the embedded part 422b with the adhesion layer 430, the length of the traverse direction width of the boundary point between the embedded part 422b and the light transmitting part 422a is relatively small.

Figure 10:
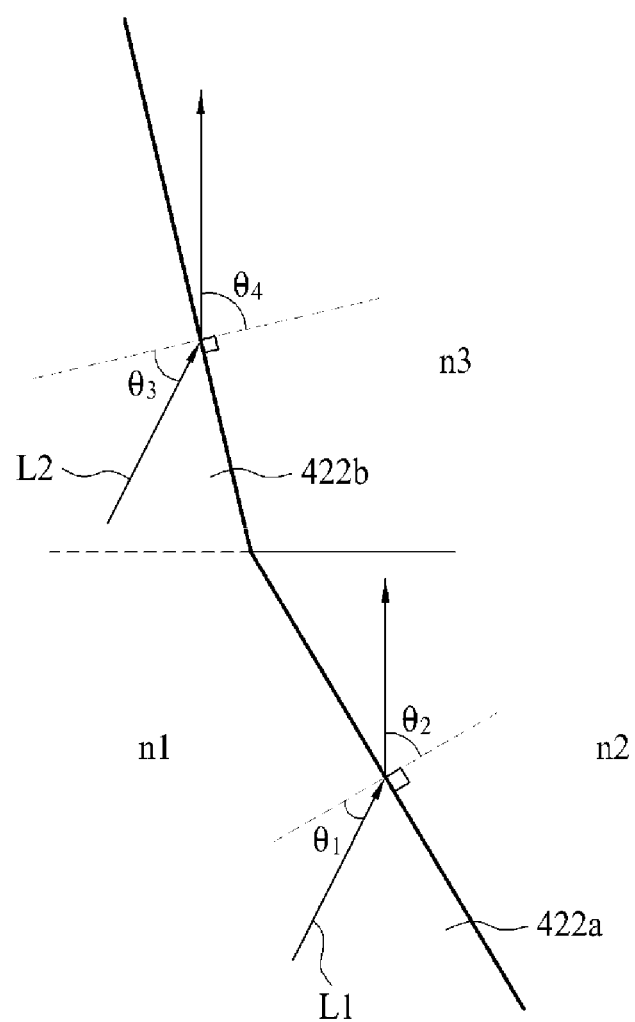
FIG. 10 is a diagram illustrating refraction of light passing through an optical sheet according to the embodiment of FIG. 2.

Referring to FIG. 10, the concentrating of the lights transmitted from the diffusion sheet in a state where the embedded part 422b is embedded in the adhesion layer 430 will be described as follows.

FIG. 10 is a diagram illustrating refraction of light passing through the lower optical sheet 420 according to the embodiment of FIG. 2.

As shown in FIG. 10, the lights transmitted from the diffusion sheet 300 are incident and pass the light transmitting part 422 to travel upward. At this time, refraction is performed in a cross section locus of the light transmitting part 422a. The light refracted at the cross section locus of the light transmitting part 422a is incident on the cross section locus of the light transmitting part 422a at an angle of θ1 with respect to a normal line and the light is refracted at an angle of θ2.

At this time, the light (L1) refracted at the cross section locus of the light transmitting part 422a is refracted toward external air and a refraction rate (n2) of the air is smaller than a refraction rate (n1) of the light transmitting part 422a. Accordingly, the angle of θ2 is more refracted than the angle of θ1 and such a principle can be shown from following Mathematical Formula 7:

$$\frac{\sin\theta_1}{\sin\theta_2} = \frac{v_1}{v_2} = \frac{\frac{c}{n1}}{\frac{c}{n2}} = \frac{n2}{n1} \rightarrow n1\sin\theta1 = n2\sin\theta2$$ [Mathematical Formula 7]

In Mathematical Formula 7, the refraction rate of the light transmitting part 422a refers to n1 and the refraction rate of the air refers to n2. Accordingly, θ1<θ2 can be calculated based on Mathematical Formula 7.

Meanwhile, the light incident from the diffusion sheet 300 is refracted in the embedded part 422b embedded in the adhesion layer 430, to be transmitted upwardly.

Here, the adhesion layer 430 is able to transmit lights and the refraction rate (n1) of the embedded part 422b has to be larger than the refraction rate (n3) of the adhesion layer 430.

As shown in the drawings, the light (L2) refracted after incident on the cross section locus of the embedded part 422b is incident on the cross section locus of the embedded part 422b at an angle of θ3 with respect to a normal line in the cross section locus of the embedded part 422b. After that, the light is refracted at an angle of θ4.

Here, the refraction rate (n1) of the embedded part 422b is larger than the refraction rate (n3) of the adhesion layer 430 and θ3<θ4 is created according to Mathematical Formula 7.

Even the embedded part 422b is configured to refract the light incident thereon and to transmit the light upwardly. Accordingly, brightness deterioration and light uniformity deterioration generated by the bonding between the upper optical sheet 410 and the lower optical sheet 420 can be reduced.

Meanwhile, traveling directions of the lights refracted by the light transmitting part 422a and the embedded part 422b, respectively, can be adjusted to be similar by an upward inclination angle of the embedded part 422b corresponding to the inclination angle of the light transmitting part 422a.

Figure 11:
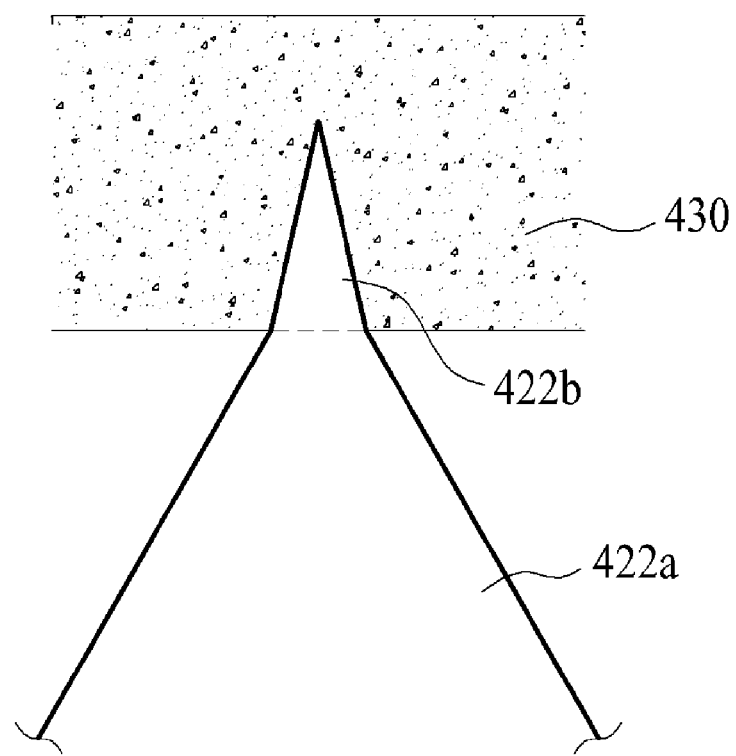
FIG. 11 is a diagram illustrating bonding between an embedded part and the adhesion layer, in a state where the thickness of the adhesion layer is larger than the height of the embedded part in the embodiment of FIG. 2.

FIG. 11 shows a state where the embedded part 422b is not in contact with the back side of the upper optical sheet 410 while the embedded part 422b_is embedded in the adhesion layer 430.

FIG. 11 is a diagram illustrating bonding between the embedded part 422b and the adhesion layer 430, in a state where the thickness of the adhesion layer is larger than the height of the embedded part in the embodiment of FIG. 2.

When the upper optical sheet 410 and the lower optical sheet 420 are bonded to each other in a state where the height of the embedded part 422b is smaller than the thickness of the adhesion layer 430, an uppermost point of the embedded part 422b may not be in contact with the back side of the upper optical sheet 410.

As shown in the drawing, unless the uppermost point of the embedded part 422b contacts with the back side of the upper optical sheet 410, a point having a discontinuous derived function of a cross section locus between a lowermost point and an uppermost point in the second structural pattern 422 is positioned in the boundary point between the light transmitting part 422a and the embedded part 422b. After that, the light refracted in the cross section locus of the embedded part 422b and the light refracted in the cross section locus of the light transmitting part 422a may travel in a similar direction.

Of course, as the adhesion layer 430 is relatively thick, the brightness might be deteriorated. However, the slope of the cross section locus possessed by the embedded part 422b is larger in an upward direction than the slope of the cross section locus possessed by the light transmitting part 422a. Accordingly, even when the uppermost point of the embedded part 422b is not in contact with the back side of the upper optical sheet 410 according to Mathematical Formula 7, the similar effect can be achieved.

Referring to FIG. 12, the position of the point having the discontinuous derived function of the cross section locus in the second structural pattern 422 will be described as follows.

FIG. 12 is a diagram illustrating the position of the point where the derived function of the cross sectional locus in the second structural pattern 422 is discontinuous according to the thickness of the adhesion layer 430 shown in FIG. 2.

As shown in FIG. 12, the size of the embedded part 422b embedded in the adhesion layer 430 and the size of the light transmitting part 422a may be differentiated according to the thickness of the adhesion layer 430.

As shown in FIG. 12 (a), not only the embedded part 422b but also a predetermined area of the light transmitting part 422a is embedded in the adhesion layer 430. When the light transmitting part 422a is partially embedded in the adhesion layer 430, the discontinuous points P1 and P2 are embedded together.

As shown in FIG. 12 (b), the embedded part 422b is partially embedded in the adhesion layer 430 and the light transmitting part 422a is not embedded therein. In case the embedded part 422b is partially embedded in the adhesion layer 430, the discontinuous points P1 and P2 are bonded to the upper optical sheet 410, in a state of being positioned outside.

The discontinuous points P1 and P2 may be positioned at the boundary point between the light transmitting part 422a and the embedded part 422b. Also, they may be positioned outside or inside the adhesion layer 430.

As mentioned above in reference to FIGS. 13 to 15, the second structural pattern 422 may be bonded to the adhesion layer 430 in various types according to the height and thickness of the adhesion layer 430.

Figure 14A:
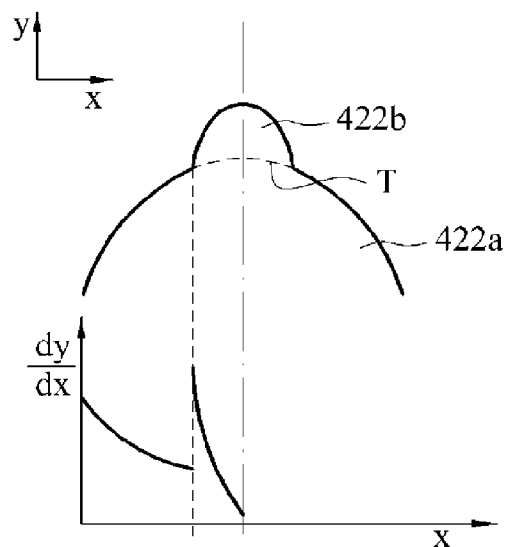
FIG. 14 is a diagram illustrating an embodiment that the cross section locus of the light transmitting part is not linear in the second structural pattern of FIG. 2.
Figure 14B:
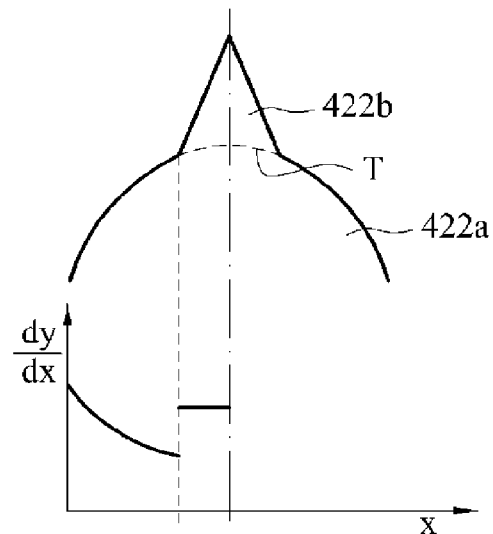
Figure 14C:
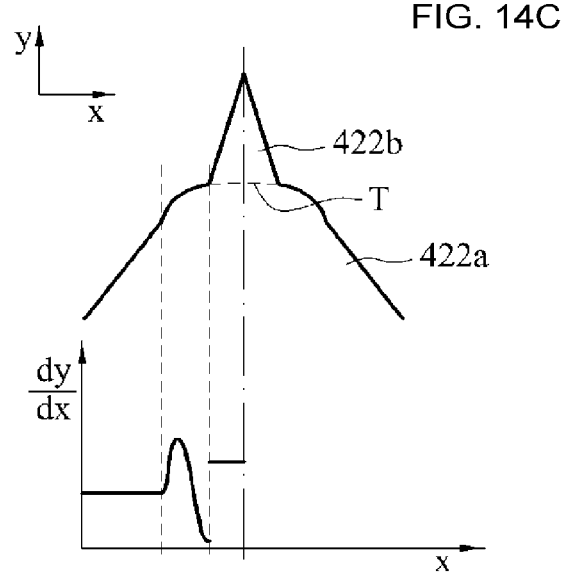
Figure 15:
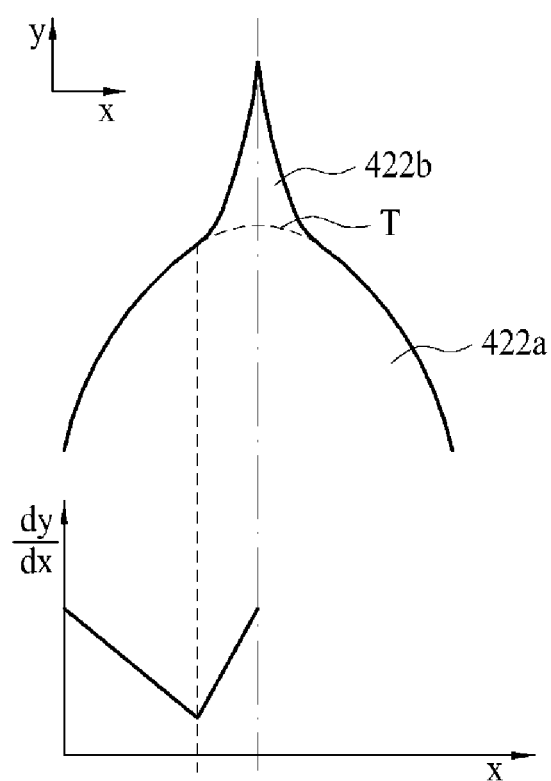
FIG. 15 is a diagram illustrating an embodiment that the derived function of the cross section locus possessed by the second structural pattern of FIG. 2 has no discontinuous point.

Referring to FIGS. 13 to 15, various types of the second structural pattern 422 according to one embodiment will be described as follows.

FIG. 13 is a diagram illustrating an embodiment showing that a cross section locus of the light transmitting part 422a is linear in the second structural pattern 422 of FIG. 2. FIG. 14 is a diagram illustrating an embodiment that the cross section locus of the light transmitting part 422a is not linear in the second structural pattern 422 of FIG. 2. FIG. 15 is a diagram illustrating an embodiment that the derived function of the cross section locus possessed by the second structural pattern 422 of FIG. 2 has no discontinuous points.

Referring to FIG. 13, the cross section locus of the light transmitting part 422a is linear. As it is formed linearly, the light transmitting part 422a can concentrate and refract the lights transmitted from the diffusion sheet 300, to transmit the concentrated and refracted lights upward.

In FIG. 13 (a), the cross section locus of the embedded part 422b possessed by the second structural pattern 422 is formed in a rectangular shape. A derived function of a cross section locus at the boundary point between the light transmitting part 422a and the embedded part 422b is discontinuous.

In FIG. 13 (a), the embedded part 422b may include a pair of extended surfaces (S1) extended from the light transmitting part 422b upward and a connecting surface (S2) for connecting the pair of the extended surfaces (S1) with each other. The circumference of the cross section locus possessed by the embedded part 422b having such the structure is larger than the circumference of the virtual cross section locus (T) possessed y the light transmitting part 422a.

The shape of the second structural pattern 422 as shown in FIG. 13 (a) will be described in detail as follows, referring to FIG. 18.

In FIG. 13 (b), the cross section locus of the embedded part 422b is sphere-shaped in the second structural pattern 422 and the embedded part 422b having the sphere-shaped cross section locus is arranged on the light transmitting part 422a. Similar to what is shown in FIG. 13 (a), the derived function of the cross section locus is discontinuous at the boundary point between the light transmitting part 422a and the embedded part 422b. As the cross section locus of the embedded part 422b is sphere-shaped, the bonding area between the embedded part 422b and the adhesion layer 430 is increased.

FIG. 14 shows that the cross section locus of the light transmitting part 422a is curved, not linear. When fabricating the light transmitting part 422a substantially, the cross section locus is typically fabricated in a linear shape. However, when they are bonded to each other, the upper optical sheet 410 and the lower optical sheet 420 might be curved by the pressure and the upper and lower optical sheets 410 and 420 may be formed in a curved shape.

FIG. 14 shows such examples of the shapes. In FIG. 14 (a), the cross section locus of the embedded part 422b is formed in a curved shape and the circumference of the cross section locus possessed by the embedded part 422b is larger than the circumference of the virtual cross section locus (T) formed by upwardly extending the light transmitting part 422a having a continuous slope.

In a graph shown in the drawing, the discontinuous points P1 and P2 where the derived functions of the cross section locus are discontinuous are positioned at the boundary point between the embedded part 422b and the light transmitting part 422a.

In FIG. 14 (b) and FIG. 14 (c), the cross section locus of the light transmitting part 422a is formed in the curved shape and the cross section locus of the embedded part 422b is formed in a triangle shape configured of straight lines. Even here, like what is shown in FIG. 14 (a), the discontinuous points P1 and P2 are positioned at the boundary point between the embedded part 422b and the light transmitting part 422a.

The cross section locus of the light transmitting part 422a possessed by the second structural pattern 422 may be formed in the other shapes except the linear shape.

Referring to FIG. 15, both of the cross section loci possessed by the embedded part 422b and the light transmitting part 422a are formed in the curved shape.

The circumference of the cross section locus possessed by the embedded part 422b is also larger than the circumference of the virtual cross section locus (T) formed by upwardly extending the light transmitting part 422a having a continuous slope.

However, as shown in the graph, a derived function of a cross section locus is continuous at a boundary point between the light transmitting part 422a and the embedded part 422b.

Even when the derived function of the cross section locus has no discontinuous points P1 and P2 between a lowermost point and an uppermost point of the second structural pattern 422, the circumference of the cross section locus possessed by the embedded part 422a may be formed larger than the circumference of the virtual cross section locus (T) possessed by the light transmitting part 422a.

In other words, even when the cross section locus is varied at the boundary point between the embedded part 422b and the light transmitting part 422a, not bent, the cross section locus circumference of the embedded part 422b can increase the bonding area of the embedded part with the adhesion layer 430 may increase accordingly, such that the similar effect can be achieved, compared with the state of having the discontinuous points P1 and P2. This embodiment is not above the scope of the present invention.

Figure 16:
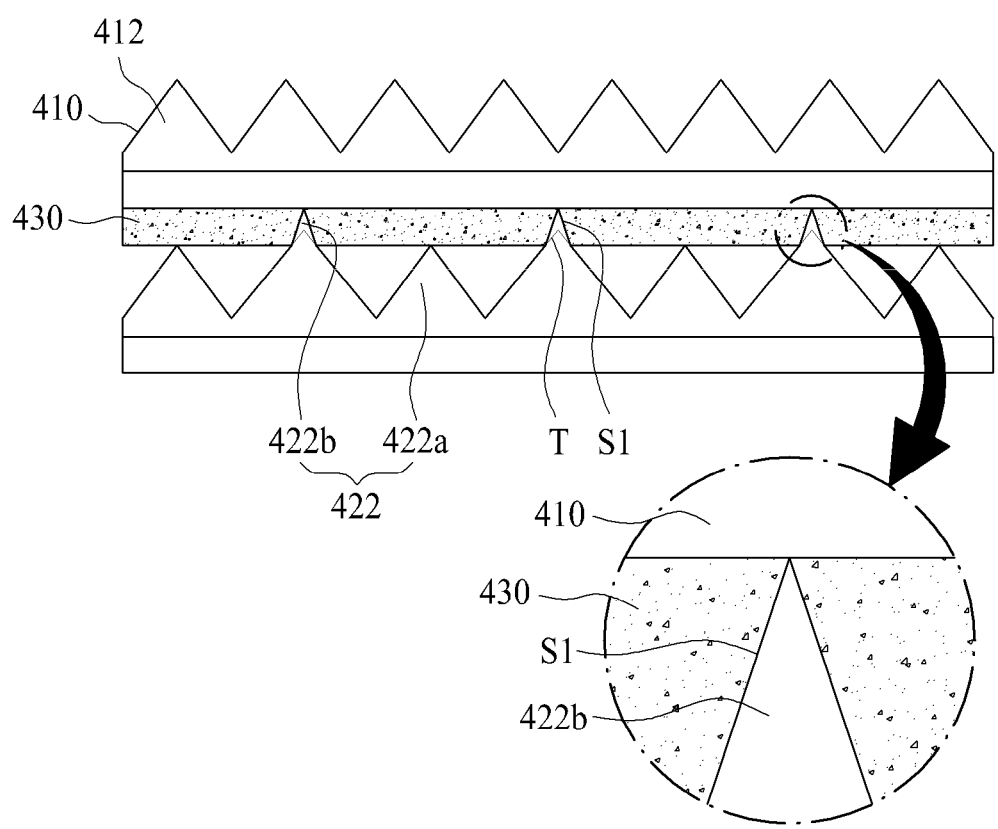
FIG. 16 is a diagram illustrating a structure of forming a non-uniform pattern of the second structural pattern provided in the optical sheet module of FIG. 2.

Referring to FIG. 16, a state where the second structural pattern is not uniform will be described as follows.

FIG. 16 is a diagram illustrating a structure of forming a non-uniform pattern of the second structural pattern provided in the optical sheet module of FIG. 2.

As shown in FIG. 16, the second structural pattern 422 is configured of patterns having different shapes that are arranged serially, different from the uniform pattern mentioned above.

The second structural pattern 422 includes a pattern having the light transmitting part 422a and the embedded part 422b and another pattern having only the light transmitting part 422a. The patterns are combined and each patterns of the second structural pattern 422 has a predetermined portion not embedded in the adhesion layer 430.

In other words, the second structural pattern 422 is configured of the patterns having two different shapes. One of the patterns is embedded in the adhesion layer 430 and the other one is not embedded. Here, the pattern embedded in the adhesion layer 430 may include the light transmitting part 422a and the embedded part 422b. The other pattern not embedded in the adhesion layer may include only the light transmitting part 422a. Both of the patterns may have upper portions embedded in the adhesion layer 430 based on the thickness of the adhesion layer 430 and the bonding thickness of the upper optical sheet 410.

The embedded part 422b can be formed in various shapes. As shown in FIG. 16, the embedded part 422b may include a pair of extended surfaces (S1) extended from the light transmitting part 422a inclined in an upward direction. Upper ends of the extended surfaces (S1) are formed to meet each other.

At this time, the distance from the uppermost point to the lowermost point of the pattern having only the light transmitting part 422a is shorter than the pattern having the light transmitting part 422a and the embedded part 422b. Accordingly, the embedded part 422a is embedded in the adhesion layer 422b and the upper optical sheet 410 and the lower optical sheet 420 are bonded to each other.

Meanwhile, as shown in the drawings, the pattern having only the light transmitting part 422a and the other pattern having the embedded part 422b and the light transmitting part 422a are arranged alternatively and repeatedly in the second structural pattern 422.

Different from what is shown in the drawing, the patterns having different shapes may be arranged irregularly, not arranged uniformly.

Optionally, different from what is shown in the drawing, the number of the patterns having only the light transmitting parts 422a formed between the patterns having the embedded parts 422b and the light transmitting parts 422a may not be fixed and it may be adjusted variously.

As shown in the drawings, the uppermost point of the embedded part 422b can contact with the back side of the upper optical sheet 410 or it can be embedded in the adhesion layer 430, not contacting with the back side.

Figure 17:
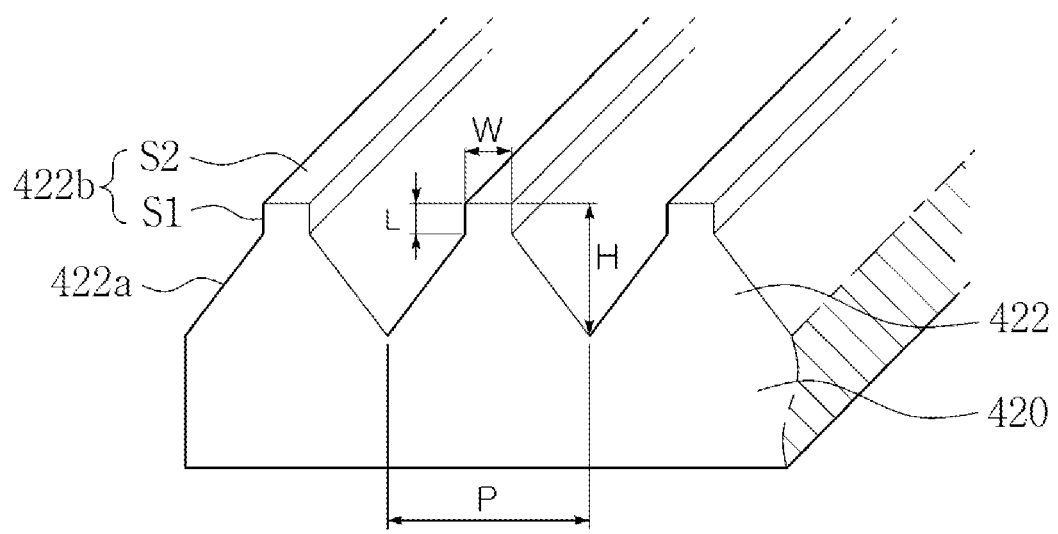
FIG. 17 is a diagram illustrating an embodiment showing that the embedded part of the second structural pattern of FIG. 2 includes an extended surface and a connected surface.
Figure 18A:
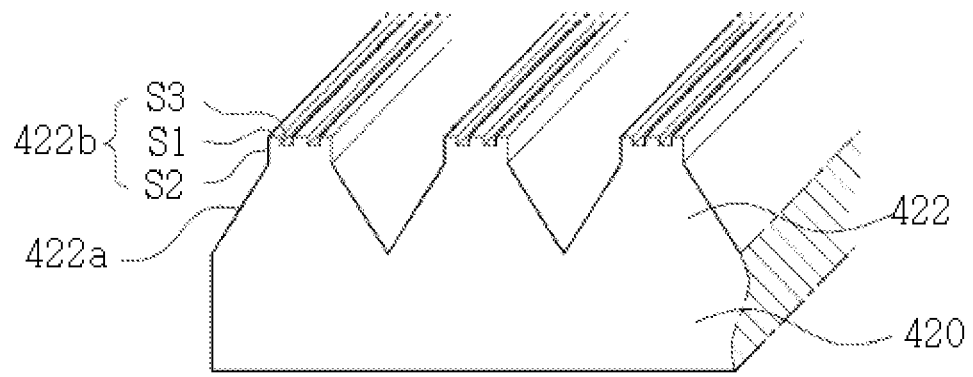
FIG. 18 is a diagram illustrating various examples of the connected surface and the extended surface possessed by the embedded part of FIG. 17.
Figure 18B:
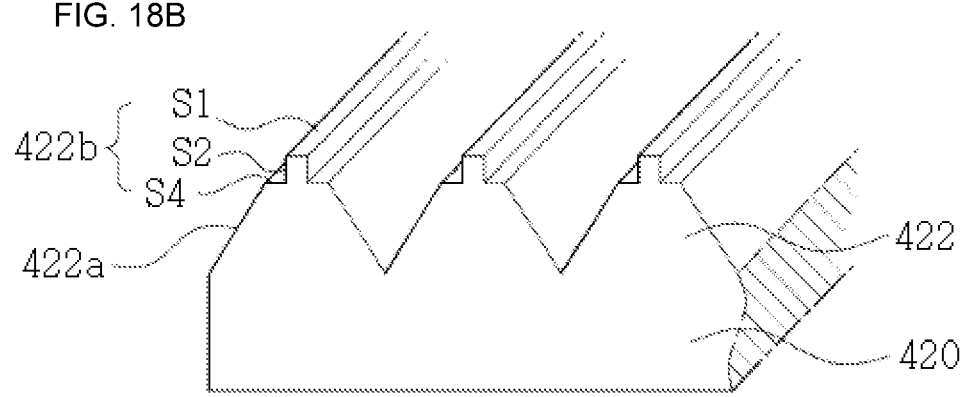
Figure 18C:
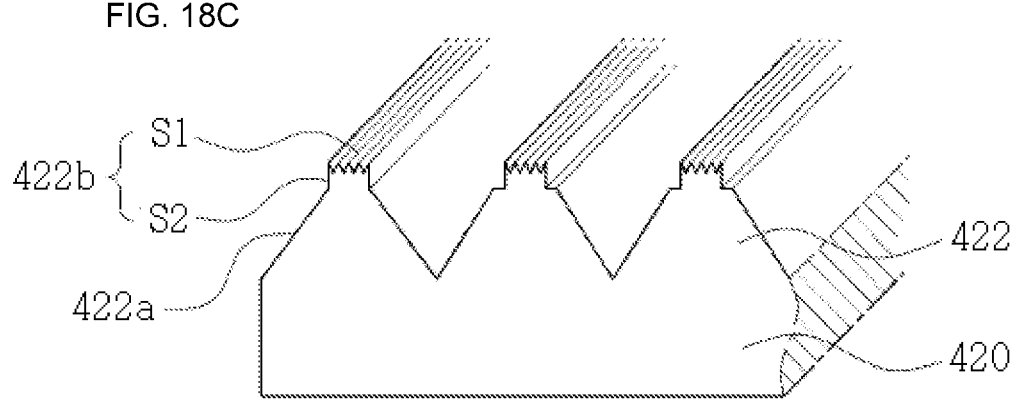

Referring to FIGS. 17 and 18, a varied type of the embedded part 422a provided in the optical sheet module according to the embodiment of the present invention will be described as follows.

FIG. 17 is a diagram illustrating an embodiment showing that the embedded part of the second structural pattern of FIG. 2 includes an extended surface and a connected surface. FIG. 18 is a diagram illustrating various examples of the connected surface and the extended surface possessed by the embedded part of FIG. 17.

As shown in FIG. 17, the embedded part 422b includes a pair of right and left extended surfaces (S1) extended a predetermined height from the right and left light transmitting parts 422a of the second structural pattern 422 approximately in a perpendicular direction, and a connected surface (S2) configured to connect the pair of the extended surfaces (S1) with each other.

The extended surfaces (S1) may be a vertical surface approximately perpendicular to the back side of the lower optical sheet. The connected surface (S2) may be a horizontal surface in parallel with the back side of the lower optical sheet 420.

Accordingly, the embedded part 422b including the connected surface (S2) together with the pair of the right and left extended surfaces (S1) may be inserted in the adhesion layer 430 to directly contact with the adhesion layer 430.

As the contacting area between the embedded part 422b and the adhesion layer 430 is enlarged, the contacting energy between them may be increased to gain a large bonding rigidity, namely, an adhesion force.

As shown in FIG. 18 (a), the embedded part 422b enlarges the contacting area with the adhesion layer 430 to increase the contacting energy. Accordingly, at least one groove (S3) may be longitudinally provided in the connected surface (S2) parallel to the back side of the upper optical sheet 410 to enhance the bonding rigidity. The adhesion layer 430 penetrates into the groove (S3) and fills the groove (S3).

Accordingly, the embedded part 422b includes the groove (S3) and the contacting area of the embedded part 422b with the adhesion layer 430 may be increased.

As shown in FIG. 18 (b), the extended surface (S1) of the embedded part 422b may be extended a predetermined height from the light transmitting part 422a to be approximately perpendicular with respect to a lower horizontal surface (S4) extended to be horizontal to the back side of the optical sheet 420, only to enhance the bonding rigidity by enlarging the contacting area with the adhesion layer 430.

Also, as shown in FIG. 18 (c), the connected surface (S2) of the embedded part 422b that is horizontal to the back side of the upper optical sheet 410 may be scratch-surface-treated to have a scratched surface, to enhance the bonding rigidity by enlarging the contacting area with the adhesion layer 430.

In such a surface treating process, the second structural pattern 422 having the embedded part 422b is formed on the lower optical sheet 420 and the connected surface (S2) is rubbed in a plasma or sputtering process to make the connected surface a roughness.

Meanwhile, three or more contacting surfaces with the adhesion layer 430 may be formed in the embedded part 422b in polygonal shapes including triangle, rectangular and pentagonal shapes to contact with the adhesion layer 430.

The height of the embedded part 422b is the same as or smaller than the thickness of the adhesion layer 430. The embedded part 422b may be continuously or discontinuously provided in a longitudinal direction of the second structural pattern 422.

Figure 19:
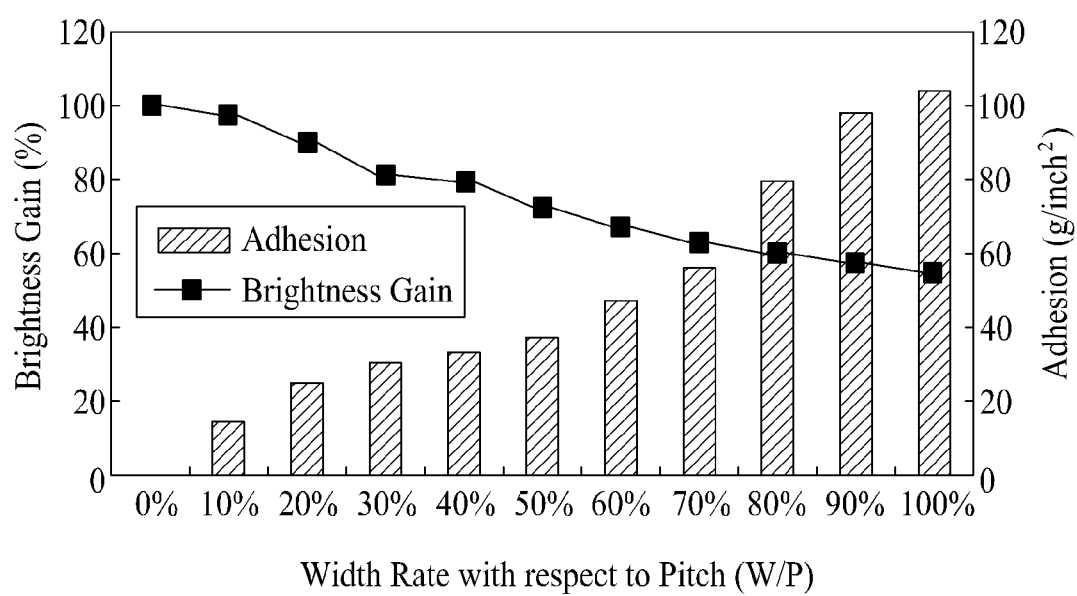
FIG. 19 is a graph illustrating an interrelation between brightness and an adhesion force based on width variation of the connected surface of FIG. 17.
Figure 20:
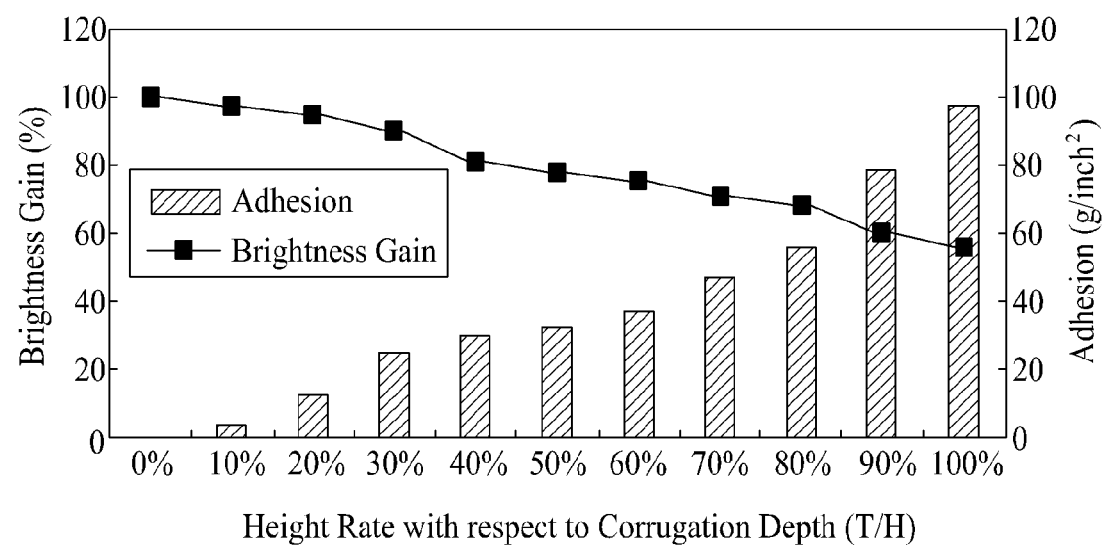
FIG. 20 is a graph illustrating an interrelation between brightness and an adhesion force based on height variation of the connected surface of FIG. 17.
Figure 21:
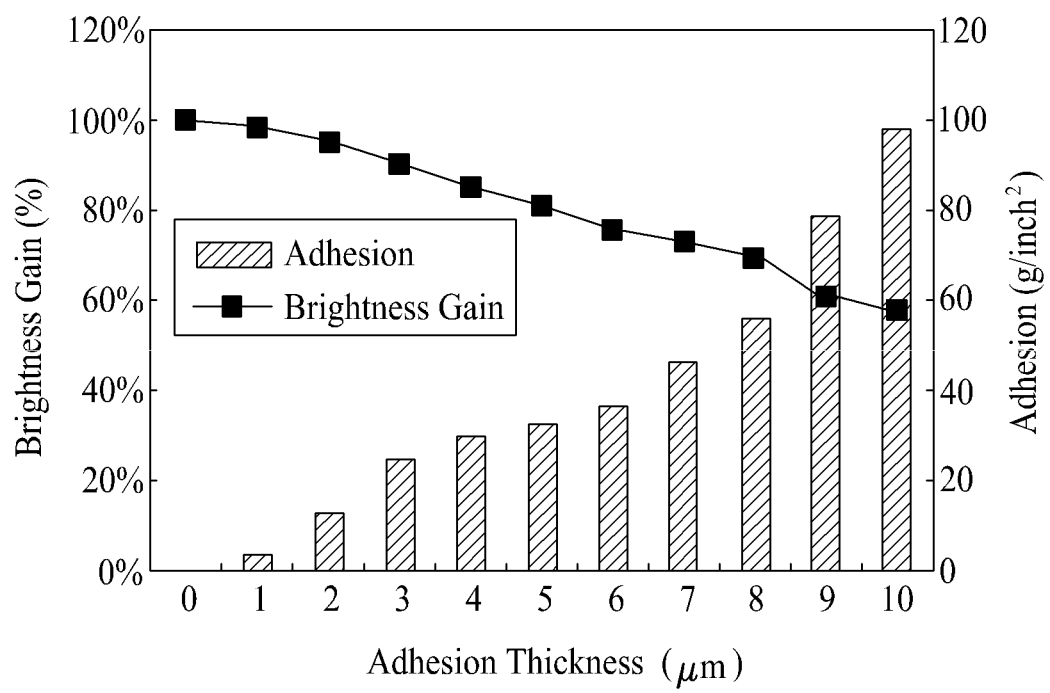
FIG. 21 is a graph illustrating an interrelation between brightness and an adhesion force based on thickness variation of the adhesion layer of FIG. 17.

Referring to FIGS. 19 to 21, brightness change according to change of the embedded part having the shape shown in FIG. 17 will be described as follows.

FIG. 19 is a graph illustrating an interrelation between brightness and an adhesion force based on width variation of the connected surface of FIG. 17.

In other words, when the width (W) of the embedded part is changed to be enlarged with respect to the pitch in a state where the height (L) and corrugation depth of the embedded part 422b is maintained uniformly, the contacting area between the embedded part 422b and the adhesion layer 430 is getting enlarged and the bonding force is gradually increased, as shown in FIG. 19 and Table 1. However, the brightness is lowered in contrast.

Here, it is preferred that the rate of the width (W) to the pitch (P) may be 10 to 30% to gain an adhesion force of 14 to 30 g/inch$^2$ that can prevent the separation of the sheet with a stable brightness of 80 to 97%. It is more preferred that the rate is 20% to gain an optimal adhesion force of 25 g/inch$^2$ with a brightness of 90%.

TABLE 1

| Width (W)/Rate (%) | 0 | 10 | 20 | 30 | 40 | 50 | 60 | 70 | 80 | 90 | 100 |
|---|---|---|---|---|---|---|---|---|---|---|---|
| Brightness (%) | 100 | 97 | 90 | 81 | 79 | 72 | 67 | 63 | 60 | 57 | 55 |
| Adhesion Force (g/inch$^2$) | 0 | 14 | 25 | 30 | 33 | 37 | 47 | 56 | 79 | 98 | 104 |

FIG. 20 is a graph illustrating an interrelation between brightness and an adhesion force based on height variation of the connected surface of FIG. 17.

When the height of the embedded part 422b is enlarged with respect to the corrugation depth (H) in a state of maintaining the width (W) and the pitch (P) of the embedded part 422b uniformly, the insertion depth of the embedded part 422b in the adhesion layer 430 is getting increased and the contacting area is enlarged as shown in FIG. 20 and Table 2. Accordingly, the adhesion force is gradually increased and the brightness is gradually lowered.

Here, it is preferred that the rate of the height (L) to the corrugation depth (H) is 20 to 40% to gain an adhesion force of 13 to 30 g/inch$^2$ that can prevent the separation of the sheet with a stable brightness of 80 to 98%. It is more preferred that the rate is 30% to gain an optimal adhesion force of 25 g/inch$^2$ with an optimal brightness of 90%.

TABLE 2

| Width (W)/Rate (%) | 0 | 10 | 20 | 30 | 40 | 50 | 60 | 70 | 80 | 90 | 100 |
|---|---|---|---|---|---|---|---|---|---|---|---|
| Brightness (%) | 100 | 98 | 95 | 90 | 81 | 78 | 75 | 68 | 68 | 60 | 56 |
| Adhesion Force (g/inch$^2$) | 0 | 4 | 13 | 25 | 30 | 33 | 37 | 47 | 56 | 79 | 98 |

FIG. 21 is a graph illustrating an interrelation between brightness and an adhesion force based on thickness variation of the adhesion layer of FIG. 17.

When the thickness of the adhesion layer 430 disposed between the lower optical sheet 420 and the upper optical sheet 410 is changed, the thickness of the adhesion layer 430 is getting larger and the adhesion force is gradually increasing as shown in FIG. 21 and Table 3. However, the brightness is getting lowered.

Here, it is preferred that the thickness of the adhesion layer 430 is 2 to 5 μm to gain an adhesion force of 13 to 33 g/inch$^2$ that can prevent the separation of the sheet with a stable brightness of 80 to 95%. It is more preferred that the thickness is 3.0 μm to gain an optimal adhesion force of 25 g/inch$^2$ with an optimal brightness of 90%.

TABLE 3

| Adhesion Layer Thickness (μm) | 0 | 10 | 20 | 30 | 40 | 50 | 60 | 70 | 80 | 90 | 100 |
|---|---|---|---|---|---|---|---|---|---|---|---|
| Brightness (%) | 100 | 98 | 95 | 90 | 85 | 81 | 76 | 73 | 69 | 61 | 58 |
| Adhesion Force (g/inch$^2$) | 0 | 4 | 13 | 25 | 30 | 33 | 37 | 47 | 56 | 79 | 98 |

Next, referring to FIGS. 22 and 23, a structure of further providing a reflective polarizer to the optical sheet module according to the embodiment of the present invention will be described as follows.

Figure 22:
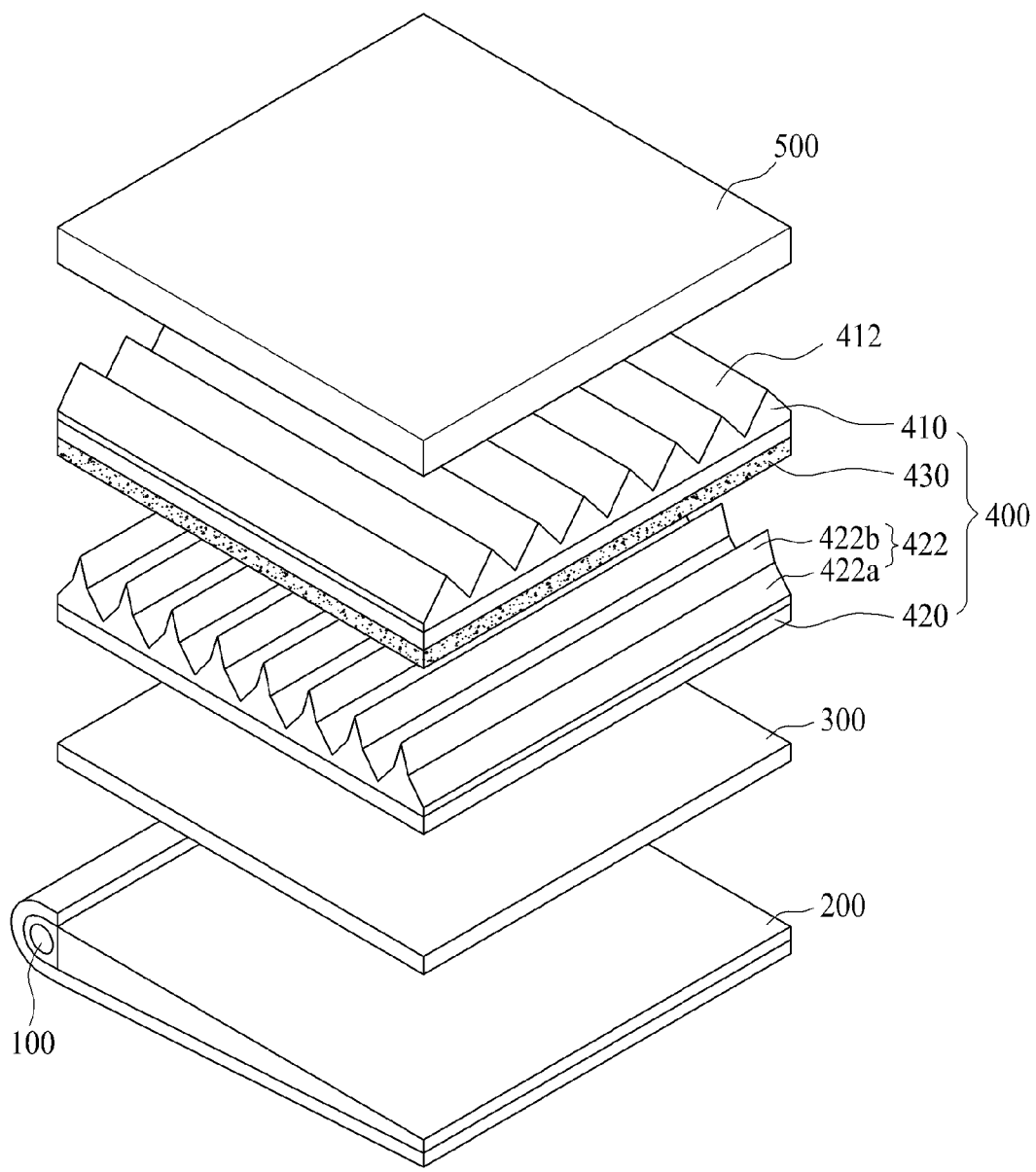
FIG. 22 is an exploded perspective diagram illustrating a reflective polarizer further provided in the optical sheet module of FIG. 2.
Figure 23:
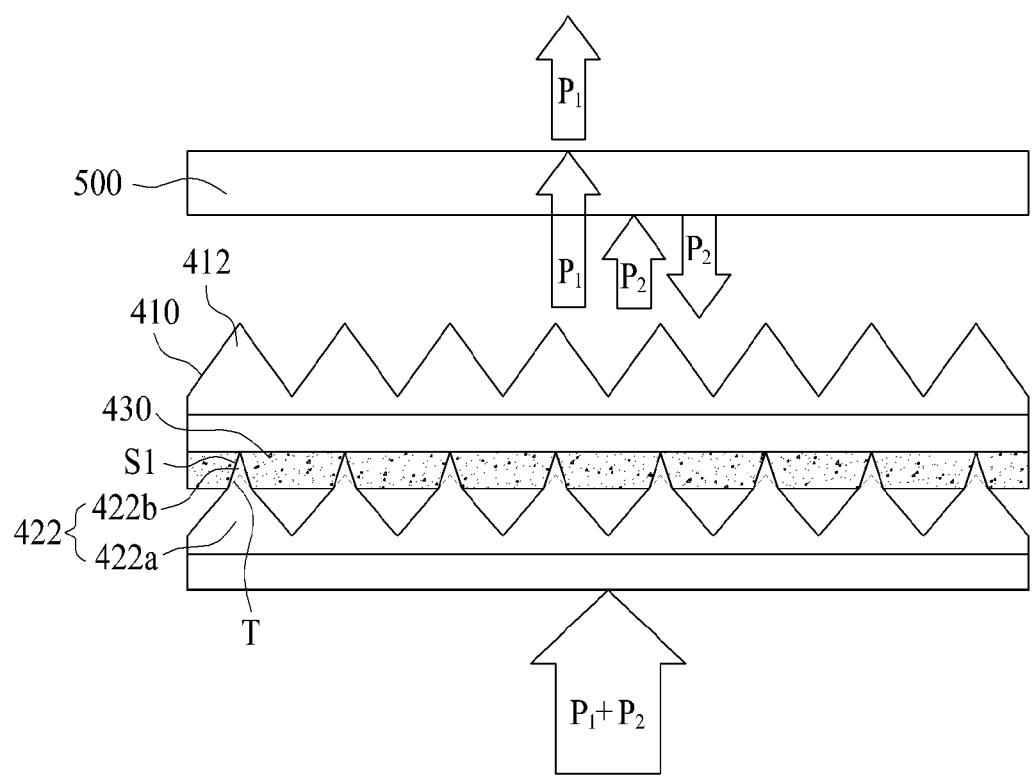
FIG. 23 is a diagram illustrating a state of the light transmitted or reflected by the reflective polarizer of FIG. 19.

FIG. 22 is an exploded perspective diagram illustrating a reflective polarizer further provided in the optical sheet module of FIG. 2. FIG. 23 is a diagram illustrating a state of the light transmitted or reflected by the reflective polarizer of FIG. 19.

As shown in the drawings, an auxiliary reflective polarizer 500 is disposed on the upper optical sheet 410. The reflective polarizer 500 selectively transmits the lights concentrated by the upper optical sheet 410 and the lower optical sheet 420.

The reflective polarizer 500 is configured to selectively transmit light according to a polarization state of the light or to return the light to the light guide plate 200. The reflective polarizer 500 may include dual brightness enhancement film (DBEF).

The light reflected after failing to pass the reflective polarizer 500 is reflected by the light guide plate 200 arranged under the BLU to travel upwardly. The reflective polarizer 500 may transmit only lights having an appropriate polarization state there through and may reflect the other lights.

Repetition of such a process can emit only the light in a desired polarization state. Accordingly, light loss can be reduced and brightness of the display module can be enhanced.

More specifically, as shown in FIG. 18, the reflective polarizer 500 is disposed on the upper optical sheet 410 and the lights concentrated while passing the lower and upper optical sheets 420 and 410 may travel toward the reflective polarizer 500. Here, the lights traveling toward the reflective polarizer 500 are mixed with lights having different polarization states. The lights may include a light (P1) having a polarization state the reflective polarizer 500 can transmit and a light (P2) having a polarization state the reflective polarizer 500 cannot transmit.

As shown in the drawings, the light having transmitted the upper optical sheet 410 and the lower optical sheet 420 is mixed with P1 and P2. The reflective polarizer 500 may transmit only the light of P1 there through and reflect the light of P2 downward again.

The P1 light is emitted outside and the P2 light is reflected to return in a downward direction, to be reflected by the light guide plate 200 and to re-travel in an upward direction after that. This process changes the polarization state of the P2 light and the repetition of the process may change the state of the reflective polarizer 500 into an appropriate state of the P2 light the reflective polarizer 500 can transmit there through.

The reflective polarizer 500 is provided and light loss can be reduced. At the same time, the light having a desired refraction angle and polarization state may be emitted upward and the brightness of the display module can be improved.

Meanwhile, the reflective polarizer 500 may be disposed on the upper optical sheet 410 and may be disposed between the upper optical sheet 410 and the lower optical sheet 420.

The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multilayer optical sheet module comprising:
    an upper optical sheet comprising a first structural pattern projected upward;
    a lower optical sheet disposed under the upper optical sheet, the lower optical sheet comprising a second structural pattern projected toward the upper optical sheet; and
    an adhesion layer provided between the upper optical sheet and the lower optical sheet,
    wherein the second structural pattern comprises,
    a light transmitting part having a traverse cross section getting smaller along an upward direction; and
    an embedded part continuously connected to an upper portion of the light transmitting part, with a predetermined portion embedded in the adhesion layer, and
    a circumference of a cross section possessed by the embedded part, contacting with the adhesion layer, is larger than a circumference of a virtual cross section locus formed by extending the light transmitting part upward, with a continuous slope.

2. The multilayer optical sheet module according to claim 1, wherein the second structural pattern is formed to make a derived function of a cross section locus have at least one discontinuous point between a lowermost point and an uppermost point.

3. The multilayer optical sheet module according to claim 2, wherein the discontinuous point is positioned in a boundary point between cross section loci possessed by the embedded part and the light transmitting part, respectively.

4. The multilayer optical sheet module according to claim 1, wherein a locus of a cross section locus possessed by the light transmitting part is linear.

5. The multilayer optical sheet module according to claim 1, wherein a locus of a cross section possessed by the embedded part, contacting with the light transmitting part, is linear.

6. The multilayer optical sheet module according to claim 5, wherein the embedded part comprises,
    a pair of extended surfaces extended from the light transmitting part upward; and
    a connected surface configured to connect the pair of the extended surfaces with each other.

7. The multilayer optical sheet module according to claim 6, wherein the embedded part is provided in a polygonal cross sectional shape having three or more contacting surfaces.

8. The multilayer optical sheet module according to claim 6, wherein the connected surface is a horizontal surface parallel to a back side of the lower optical sheet.

9. The multilayer optical sheet module according to claim 6, wherein the connected surface comprises at least one groove.

10. The multilayer optical sheet module according to claim 6, wherein the connected surface is surface-treated to have a predetermined roughness.

11. The multilayer optical sheet module according to claim 6, wherein the extended surface is vertically extended from a lower horizontal surface parallel to a back side of the lower optical sheet, and
    the lower horizontal surface is horizontally extended from an end of the light transmitting part.

12. The multilayer optical sheet module according to claim 5, wherein the embedded part comprises,
    a pair of extended surface extended from the light transmitting part inclined in an upward direction, and
    upper ends of the extended surfaces meet each other.

13. The multilayer optical sheet module according to claim 1, wherein an uppermost point of the embedded part contacts with a back side of the upper optical sheet.

14. The multilayer optical sheet module according to claim 1, wherein the second structural pattern is extended along a traverse direction, with a uniform cross section shape.

15. The multilayer optical sheet module according to claim 14, wherein the upper optical sheet and the lower optical sheet are arranged to make an extension direction of the first structural pattern and an extension direction of the second structural pattern intersect each other.

16. The multilayer optical sheet module according to claim 1, further comprising:
    a reflective polarizer disposed on the lower optical sheet or the upper optical sheet to selectively transmit light based on a wavelength of the light transmitted from a lower portion.

17. The multilayer optical sheet module according to claim 1, wherein the adhesion layer is formed on a back side of the upper optical sheet or a top side of the lower optical sheet facing the back side of the upper optical sheet, in a dotted shape.

18. The multilayer optical sheet module according to claim 1, wherein the adhesion layer is formed in a surface of the second structural pattern possessed by the lower optical sheet or a back side of the upper optical sheet facing the second structural pattern, in a linear shape.

19. The multilayer optical sheet module according to claim 1, wherein the adhesion layer is formed in a surface of the second structural pattern possessed by the lower optical sheet or a back side of the upper optical sheet facing the second structural pattern, in a mesh shape having a plurality of open areas.

20. A multilayer optical sheet module comprising:
    an upper optical sheet comprising a first structural pattern projected upward;
    a lower optical sheet disposed under the upper optical sheet, the lower optical sheet comprising a second structural pattern projected toward the upper optical sheet; and
    an adhesion layer provided between the upper optical sheet and the lower optical sheet,
    wherein the second structural pattern having a traverse cross section getting smaller along an upward direction comprises,
    one or more discontinuous points having a discontinuously increasing slope between a lowermost point and an uppermost point.

21. The multilayer optical sheet module according to claim 20, wherein a refraction rage of the second structural pattern is larger than a refraction rate of the adhesion layer.

22. The multilayer optical sheet module according to claim 20, wherein the second structural pattern comprises,
   a light transmitting part not embedded in the adhesion layer, with a predetermined slope; and
   an embedded part extended toward a top side of the light transmitting part, with a predetermined portion embedded in the adhesion layer.

23. The multilayer optical sheet module according to claim 22, wherein the embedded part comprises at least two extended surfaces extended upward.

24. The multilayer optical sheet module according to claim 22, wherein the embedded part comprises a pair of extended surfaces extended upward, and
   a cross section of the embedded part is formed in a triangle shape by the extended surfaces.

25. The multilayer optical sheet module according to claim 22, wherein the height of the embedded part is the same as or smaller than the thickness of the adhesion layer.

26. A multilayer optical sheet module comprising:
   an upper optical sheet comprising a first structural pattern projected upward;
   a lower optical sheet disposed under the upper optical sheet, the lower optical sheet comprising a second structural pattern projected toward the upper optical sheet; and
   an adhesion layer provided between the upper optical sheet and the lower optical sheet,
   wherein the second structural pattern having a traverse cross section getting smaller along an upward direction comprises,
   a light transmitting part having a linear cross section; and
   an embedded part having a linear shape connected to the light transmitting part inclined in an upward direction.

27. The multilayer optical sheet module according to claim 26, wherein the embedded part comprises
   a pair of extended surface extended from the light transmitting part inclined in an upward direction, and
   upper ends of the extended surfaces meet each other.

28. The multilayer optical sheet module according to claim 26, wherein a cross section of the embedded part is formed in a triangle shape.

29. The multilayer optical sheet module according to claim 26, further comprising:
   a reflective polarizer disposed on the lower optical sheet or the upper optical sheet to selectively transmit light based on a wavelength of the light transmitted from a lower portion.

30. A multilayer optical sheet module comprising:
   an upper optical sheet comprising a first structural pattern projected upward;
   a lower optical sheet disposed under the upper optical sheet, the lower optical sheet comprising a second structural pattern projected toward the upper optical sheet; and
   an adhesion layer provided between the upper optical sheet and the lower optical sheet, and
   the second structural pattern having a plurality of patterns, which partially has a traverse cross section area getting smaller along an upward direction, comprises,
   one or more discontinuous points having a discontinuously increasing slope between a lowermost point and an uppermost point.

31. The multilayer optical sheet module according to claim 30, wherein the distance from the uppermost point to the lowermost point possessed by one pattern is longer than the distance possessed by a neighboring pattern in the second structural pattern.

32. The multilayer optical sheet module according to claim 30, wherein patterns having different shapes are repeatedly arranged in the second structural pattern.

33. The multilayer optical sheet module according to claim 30, wherein the second structural pattern comprises,
   a light transmitting part having a traverse cross section getting smaller along an upward direction; and
   an embedded part continuously connected to an upper portion of the light transmitting part, with a predetermined portion embedded in the adhesion layer.

34. The multilayer optical sheet module according to claim 33, wherein a circumference of a cross section possessed by the embedded part, contacting with the adhesion layer, is larger than a circumference of a virtual cross section locus formed by extending the light transmitting part upward, with a continuous slope.

35. The multilayer optical sheet module according to claim 30, wherein a refraction rage of the second structural pattern is larger than a refraction rate of the adhesion layer.

* * * * *